US011467707B1

(12) United States Patent
Wilson et al.

(10) Patent No.: US 11,467,707 B1
(45) Date of Patent: Oct. 11, 2022

(54) COMPUTER NETWORKS

(71) Applicant: EXEMPT ME NOW, INC., New Orleans, LA (US)

(72) Inventors: Sevetri Wilson, New Orleans, LA (US); Blue Thomas, New Orleans, LA (US); Brett Grau, New Orleans, LA (US); Dinesh Nadar, New Orleans, LA (US); Rebecca Larson, New Orleans, LA (US)

(73) Assignee: Exempt Me Now, Inc., New Orleans, LA (US)

( * ) Notice: Subject to any disclaimer, the term of this patent is extended or adjusted under 35 U.S.C. 154(b) by 0 days.

(21) Appl. No.: 17/697,697

(22) Filed: Mar. 17, 2022

Related U.S. Application Data

(60) Provisional application No. 63/252,144, filed on Oct. 4, 2021.

(51) Int. Cl.
| | |
|---|---|
| *G06F 3/0481* | (2022.01) |
| *G06F 16/901* | (2019.01) |
| *G06F 16/958* | (2019.01) |
| *G06F 3/0482* | (2013.01) |
| *H04L 67/50* | (2022.01) |

(52) U.S. Cl.
CPC .......... *G06F 3/0481* (2013.01); *G06F 3/0482* (2013.01); *G06F 16/9024* (2019.01); *G06F 16/958* (2019.01); *H04L 67/535* (2022.05)

(58) Field of Classification Search
CPC .. G06F 3/0481; G06F 16/958; G06F 16/9024; G06F 3/0482; H04L 67/535
See application file for complete search history.

(56) References Cited

U.S. PATENT DOCUMENTS 9,424,536 B2 * 8/2016 Bear ................. G06F 3/04817
10,871,878 B1 * 12/2020 Mody ................. G06F 16/26
(Continued)

OTHER PUBLICATIONS

Wise, Jon, "threshold Launches b.world the World's First Program Design, Delivery, and Storytelling Platform.", URL: https://www.threshold.world/post/threshold-launches-b-world-the-world-s-first-program-design-delivery-and-storytelling-platform, Apr. 7, 2021, pp. 1-2.

(Continued)

*Primary Examiner* — Anil K Bhargava
(74) *Attorney, Agent, or Firm* — FisherBroyles, LLP

(57) ABSTRACT

The disclosed method may include (i) aggregating, within a group network application, program user accounts registered to perform a respective task defined in a database of the group network application with resource user accounts registered as sources to provide resources for performance of the respective task, (ii) provisioning a program application subcomponent within the group network application that enables a specific program user account to complete a program data structure that defines the respective task, (iii) provisioning a metadata application subcomponent within the group network application that enables the specific program user account to enter rich network data that describes the respective task defined in the database, and (iv) linking, within the database of the group network application, and in response to user instruction, the program data structure completed through the program application subcomponent with the rich network data entered through the metadata application subcomponent.

19 Claims, 27 Drawing Sheets

(56) References Cited

U.S. PATENT DOCUMENTS

| | | | |
|---|---|---|---|
| 2012/0311497 A1* | 12/2012 | Bear | G06F 3/04842 |
| | | | 715/823 |
| 2014/0136381 A1* | 5/2014 | Joseph | G06Q 40/02 |
| | | | 705/35 |
| 2016/0275436 A1* | 9/2016 | Kurjanowicz | G06Q 10/06398 |
| 2021/0141838 A1* | 5/2021 | Atallah | G06F 16/90332 |

OTHER PUBLICATIONS

Resilia, "Nonprofit Courses", URL: https://www.resilia.com/blog/nonprofit-courses, Nov. 18, 2021, retrieved on Mar. 23, 2022, pp. 1-4.

Resilia, "Resilia Launches Nonprofit Platform That Makes Capacity Building Possible For Nonprofits", URL: https://www.resilia.com/blog/resilia-launches-nonprofit-platform-that-makes-capacity-building-possible-for-nonprofits, Apr. 27, 2021, retrieved on Mar. 23, 2022, pp. 1-4.

Resilia, "Resilia Launches Nonprofit Platform to Address Philanthropy Deserts and Increase Nonprofit Capacity", URL: https://www.resilia.com/blog/resilia-launches-nonprofit-platform-to-address-philanthropy-deserts-and-increase-nonprofit-capacity, Apr. 13, 2021, pp. 1-5.

Resilia, "Build Back Better with Resilia's Funder Platform", URL: https://www.resilia.com/blog/7d3pmsxkqzltiouxzqt6xiy8bhu7uad, Feb. 17, 2021, retrieved on Mar. 23, 2022, pp. 1-4.

* cited by examiner

COMPUTER NETWORKS

CROSS-REFERENCE TO RELATED APPLICATION(S)

This application claims priority to provisional application 63/252,144, filed Oct. 4, 2021, and titled "SYSTEMS AND METHODS FOR CONNECTING USER ACCOUNTS," the entirety of which is incorporated herein by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 12 is a diagram of an example graphical user interface for instructions to complete a program data structure.

FIG. 20 is a diagram of an example graphical user interface for limiting access to resource user accounts according to a gating model.

Figure 1:
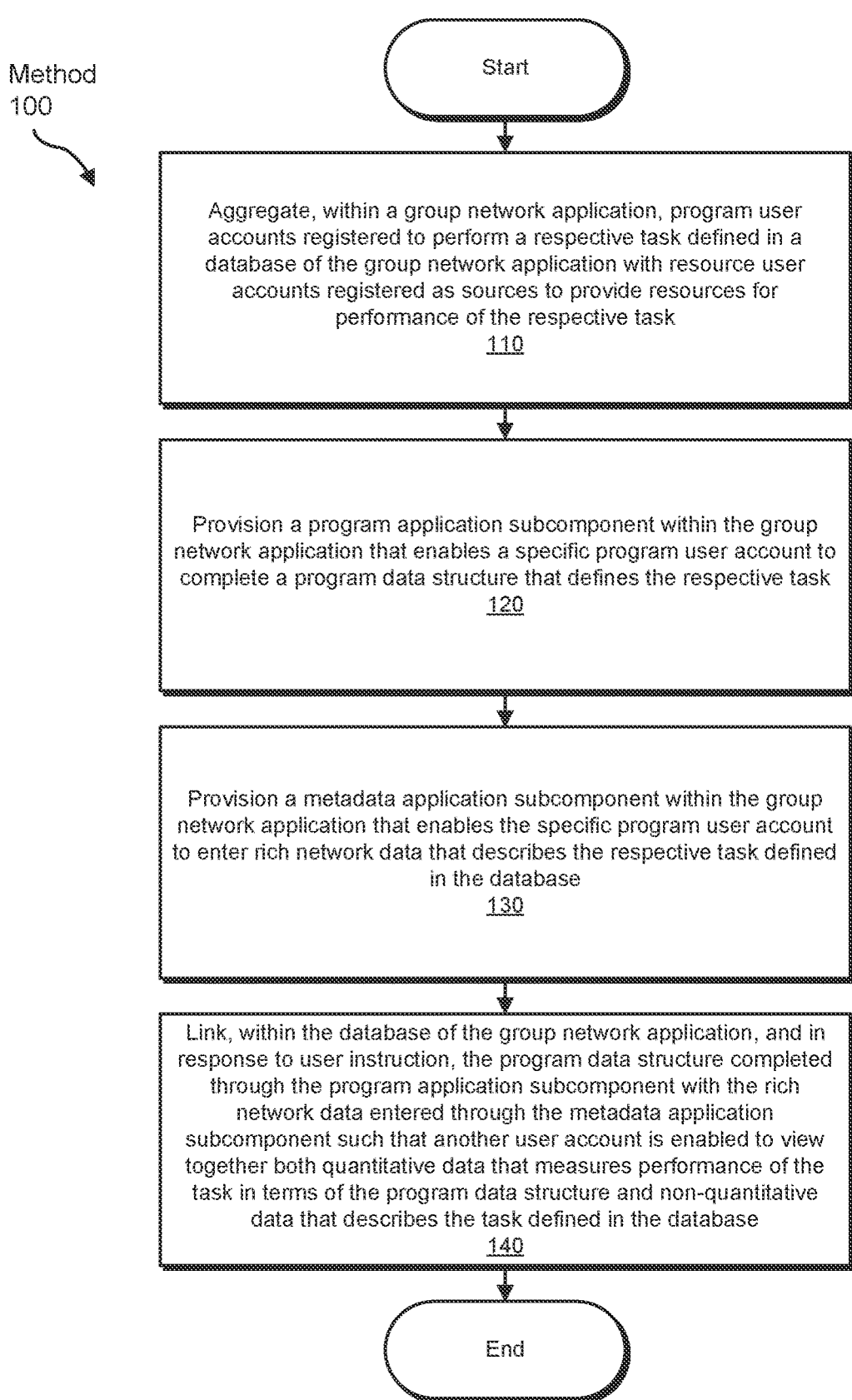
FIG. 1 is a flow diagram of an example method for connecting user accounts.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Modern group network applications may connect user accounts to achieve a variety of new and beneficial purposes. For example, certain popular group network applications may provide general-purpose group networking to connect users, friends, relatives, and/or families, etc. Similarly, more niche group network applications may provide targeted group networking services to connect a specific and more narrowly defined set of user accounts within a particular context.

One particular context that may benefit from new and inventive applications of group networking technology may include resource provisioning. Within this context, one set of user accounts (e.g., "program user accounts") may seek to achieve a goal, task, or solution, and another set of user accounts (e.g., "resource user accounts") may provision a set of resources to achieve that specific goal, task, or solution. One illustrative example of such resource provisioning may correspond to the nonprofit organization context. In this particular example, program user accounts may seek resources from an individual, another user account, a government agency, and/or a charitable foundation, for example. Nevertheless, resource provisioning and the technology of this application potentially apply broadly within many other contexts that are not legally established as nonprofit organizations. For example, the set of program user accounts may be grouped together within a group network application without a formal legal structure, much less a formal nonprofit organization structure.

The technology of this application may improve upon related group networking technology in a variety of manners. In some examples, the technology may provide a new and cleverly inventive technique for dynamically linking, in response to user instruction, descriptive rich network data for a particular program data structure with more quantitative data that tracks or measures performance toward a goal corresponding to the program data structure. Moreover, the technology may be implemented within a user-friendly interface or interface on the web or mobile application for convenient usage by one or more less technically sophisticated program user accounts, as further discussed below. Similarly, some illustrative examples of the interface or interface may enable a program user account to dynamically add multiple dimensions to a program data structure such that a corresponding graph is dynamically updated and may be simultaneously displayed with the interface. In other examples, the resource provisioning context may provide new and inventive applications for gating technology that dynamically limits access to one or more portions of the group network application based on an underlying set of specific rules or conditions. These and other advantages of the technology of this application are discussed in more detail below.

As lexicographer, applicant hereby establishes the following definitions for terms. As used herein, the term "group" generally refers to a "social" group or network, unless another meaning is indicated. As used herein, the term "program" generally refers to an initiative or project, unless another meaning is indicated (e.g., a software program). As used herein, the term "metadata" generally refers to a story or narrative that describes a program, unless another meaning is indicated. As used herein, the term "non-quantitative" data generally refers to qualitative data. As used herein, the term "rich network data" generally refers to multimedia or rich network data that may be transferred over a network. Similarly, the terms "instruct" or "instruction" generally refer to input unless indicated otherwise.

FIG. 1 shows an illustrative flow diagram for a method 100, which may be computer implemented. At step 110, one or more of the systems described herein may aggregate, within a group network application, program user accounts registered to perform a respective task defined in a database of the group network application with resource user accounts registered as sources to provide resources for performance of the respective task. For example, at step 110 an aggregation module within a corresponding computing system may perform step 110.

Step 110 may be performed in a variety of ways. Generally speaking, a corresponding group network application may aggregate, unite, or enable interaction between two sets of user accounts. A first set of user accounts may correspond to program user accounts, or the term "program user accounts" may simply refer to user accounts registered to perform a particular task or achieve a particular goal, as discussed above, and to seek resources to facilitate the performance of that particular task. In contrast, the second set of user accounts may correspond to resource user accounts, and these user accounts may be registered as sources for providing resources to facilitate the program user accounts and performing the particular task. In this sense, the resource user accounts do not necessarily, or even likely, directly perform the particular task.

Figure 20:
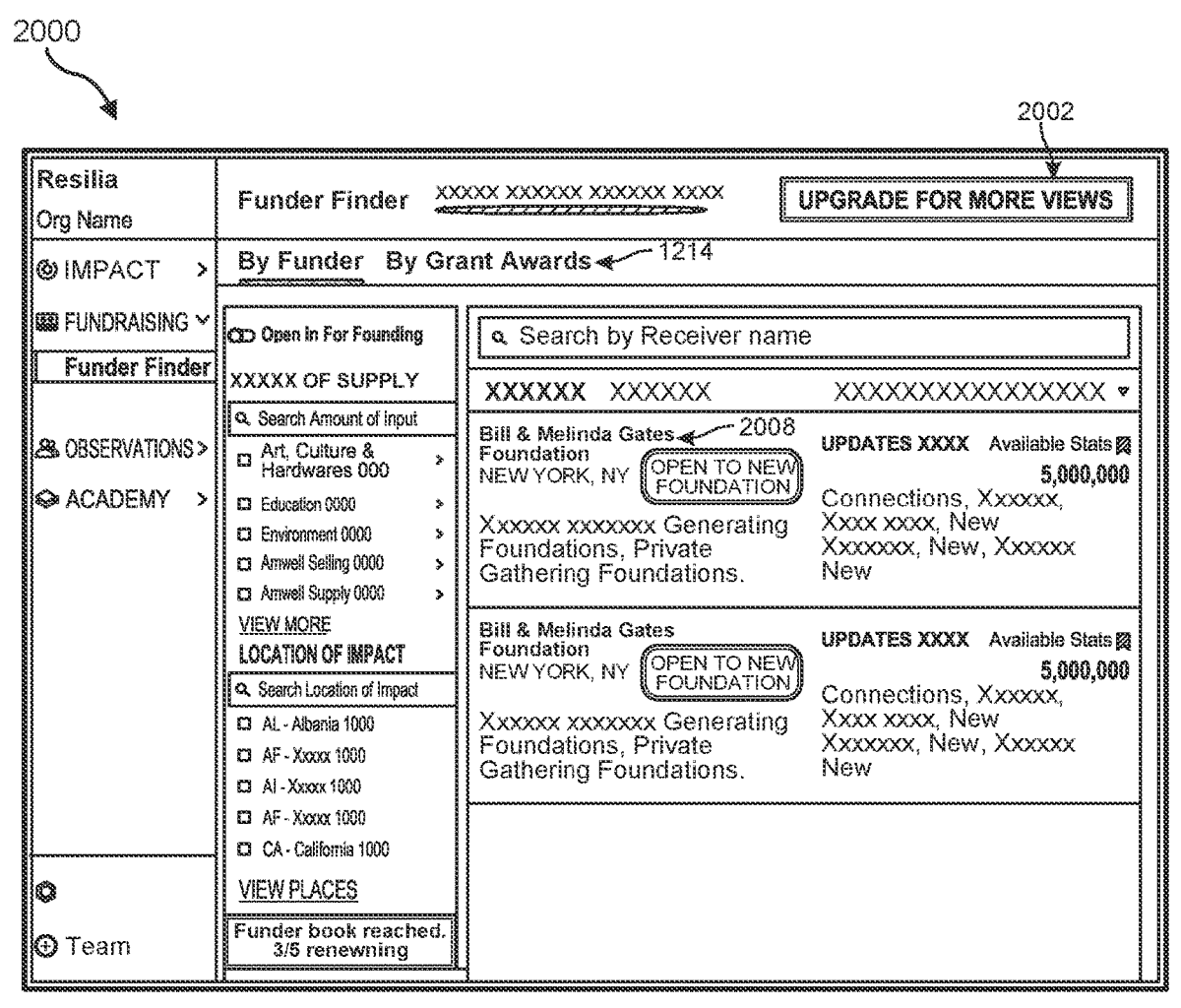

An illustrative example of a program user account may correspond to a nonprofit organization or individual (e.g., employee, manager, leader, etc.) of such an organization. An illustrative example of a resource user account may correspond to a charitable foundation or private foundation. A more particular example of a resource user account is illustrated in FIG. 20, for example, and as discussed further below.

Figure 3:
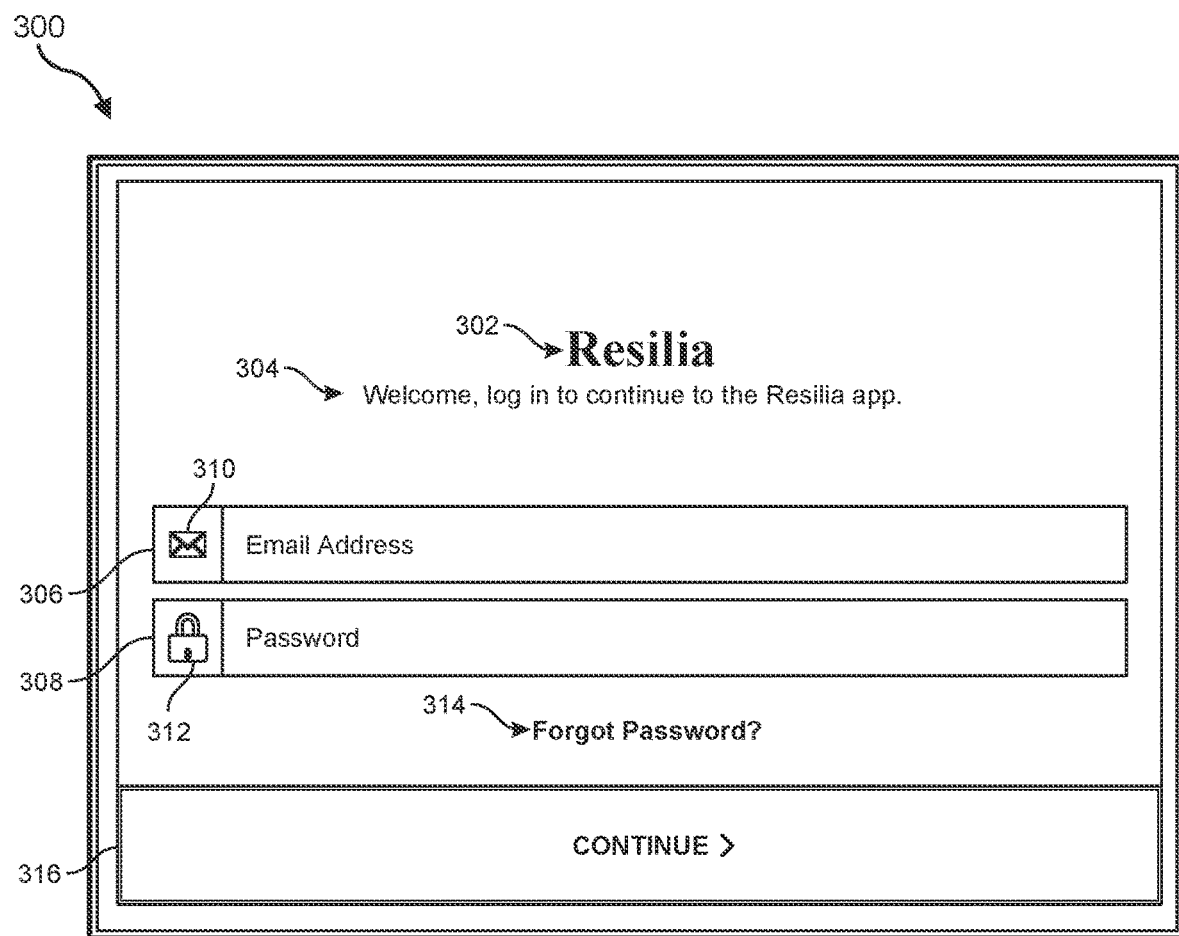
FIG. 3 is a diagram of an example graphical user interface login screen.

FIG. 3 shows an illustrative example of a login graphical user interface 300, which may include a group network application identifier 302, a welcome headline 304, an email icon 310, an email instruction interface 306, a password icon 312, and a password instruction interface 308, as well as a forgotten password instruction element 314, and a continue button 316. Login graphical user interface 300 may correspond to a standard login user interface that is newly applied to the context of resource provisioning between a set of program user accounts and a set of resource user accounts, as further discussed above and below.

Furthermore, although not depicted in the drawings, the corresponding group network application may provide similar registration portals. When registering a new user account, the group network application may request or require instruction specifying whether the new user account will correspond to a program user account or a resource user account. The group network application may also optionally apply one or more conditions to the registration of either type of user account. For example, the group network application may require proof, paperwork, evidence, verification, and/or documentation (e.g., from a bank, brokerage, government entity, or other authority), regarding the identity, legal or nonprofit status and maintenance, obedience of the non-distribution constraint, an amount of resources previously acquired or available for funding, etc. For example, the group network application may require documentation, proof, paperwork, and/or a certificate that a corresponding organization satisfies the conditions of one or more statutes, laws, or rules that govern non-profits or private foundations, etc., and may condition registration upon receipt and verification of the same. In further examples, the group network application may use an algorithm, heuristic, or machine learning function to automatically or autonomously verify the authenticity, accuracy, and/or correctness of such documentation, without any necessary human intervention, thereby streamlining the registration process. In some examples, registration may be provided according to a free, freemium, or payment/subscription model, including gating models discussed further below in connection with FIGS. 20-21.

Returning to FIG. 1, at step 120, one or more of the systems described herein may provision a program application subcomponent within the group network application that enables a specific program user account to complete a program data structure that defines the respective task. For example, a provisioning module within a corresponding computing system may perform step 120.

Figure 9:
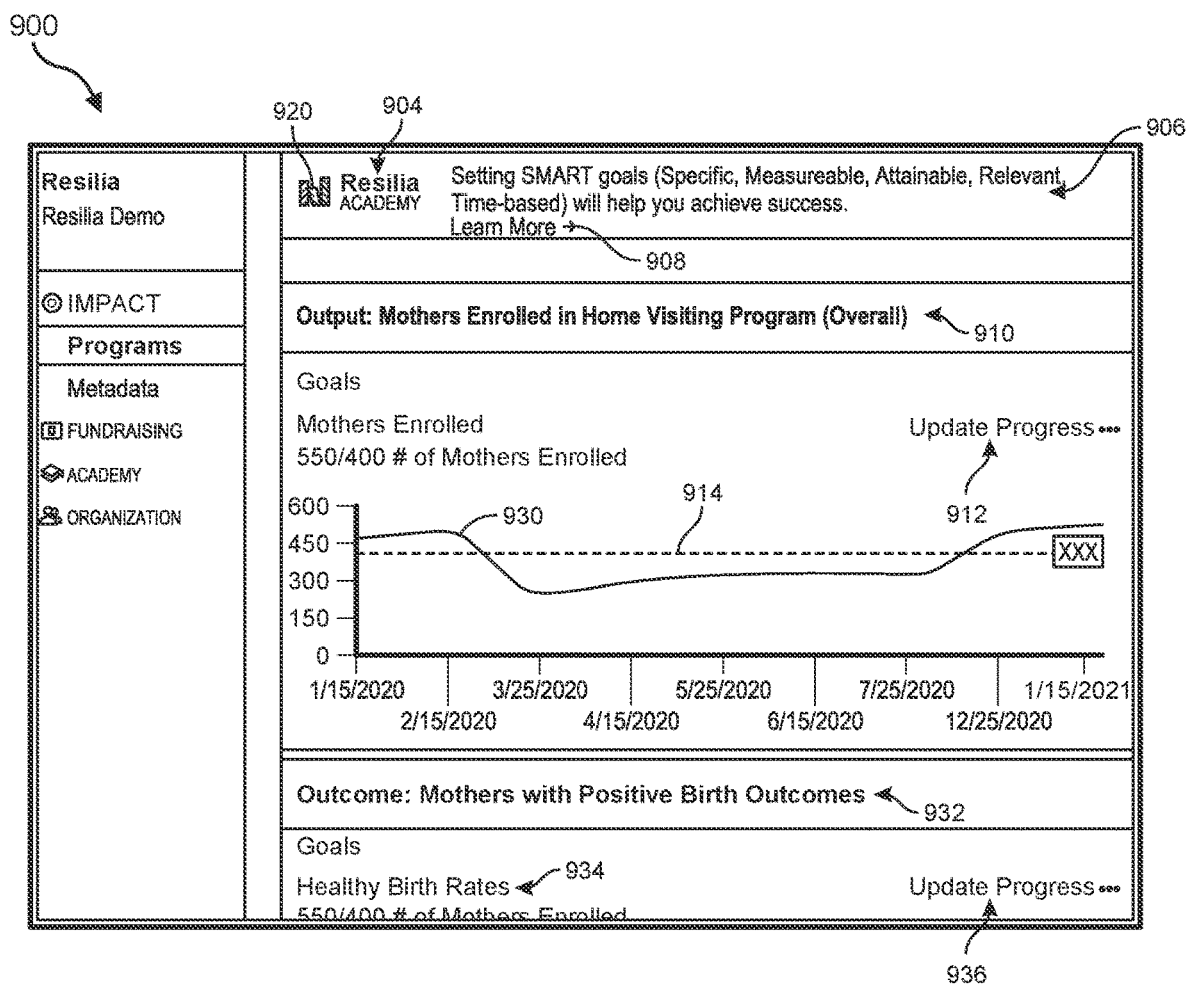
FIG. 9 is a diagram of an example graphical user interface for displaying a goal in connection with a program data structure.

Step 120 may be performed in a variety of ways. FIG. 9 shows an illustrative graphical user interface in connection with a program data structure. The term "program data structure" may refer to a data structure that defines a goal, endeavor, pursuit, or objective for a corresponding set of program user accounts, as further discussed above. Thus, the program data structure may include fields or elements that correspond to identifiers of individuals or program user accounts assigned to the program data structure, a numerical goal to be achieved or pursued, one or more descriptors that define how the goal is measured or the units in which the goal is measured, historical performance data tracking performance toward the goal, including timing or date data tracking the timing of the historical performance data, etc.

FIG. 9 shows an illustrative graphical user interface 900 that further illustrates how the group network application may display data corresponding to the program data structure. As further shown in this figure, graphical user interface 900 may include an icon 920 corresponding to an educational component of a group network application, corresponding to a brand icon 904. The graphical user interface 900 may also include a headline 906 educating the program user accounts about improving techniques for better establishing and defining one or more goals with respect to the program data structure. The graphical user interface may also include an instruction element 908 that, when toggled, enables the program user account to learn more about these improving techniques.

The graphical user interface 900 also further shows a graph that tracks progress toward achievement of the goal. A horizontal bar depicted as dashed line 914 may correspond to the specific goal to be achieved (in the example of this figure, 400 mothers enrolled within a home visiting program). A curving line 930 may correspond to actual historical tracking data showing actual performance of the corresponding program in terms of pursuing the goal. An instruction element 912 may also enable a program user account to conveniently, and in a user-friendly manner, add new data in addition to the data that is already been entered into the database, archived, and/or displayed in the graph. A headline 910 may describe the overall program that corresponds to the program data structure, and the graph of mothers enrolled may correspond to a specific goal of this particular program data structure.

In some examples, a particular program data structure may establish multiple goals and corresponding historical tracking data rather than just one goal. For example, another headline 932 may describe another program data structure, and a headline 934 may specify a corresponding goal. Furthermore, another instruction element 936 may enable a program user account to update progress for this particular goal.

Figure 12:
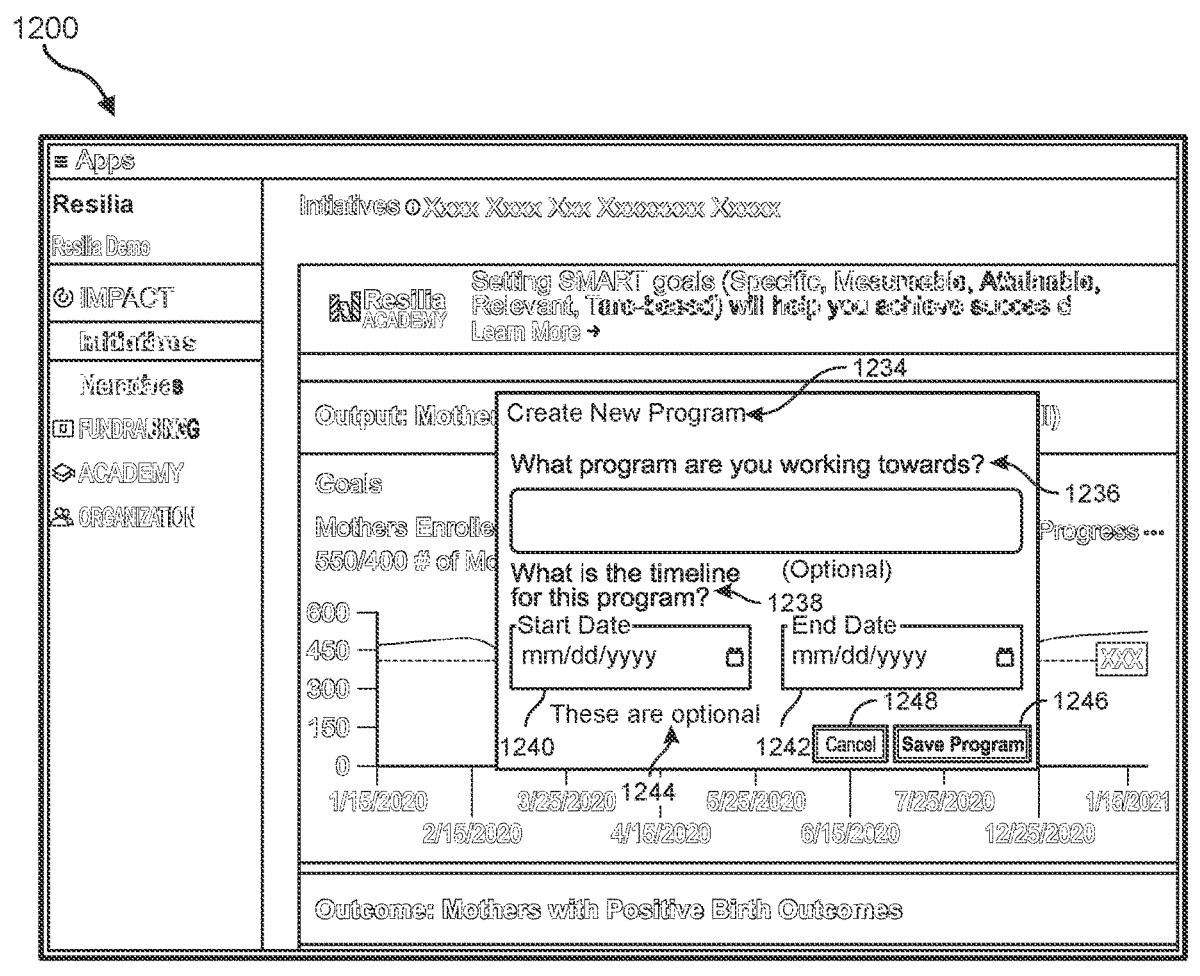

FIG. 12 shows another graphical user interface 1200 that may facilitate program user accounts in creating a new program by completing a corresponding program data structure, as further discussed above. In particular, this graphical user interface may include a headline 1234 that indicates to the program user account that the graphical user interface may facilitate the creation of the program data structure. The graphical user interface may also include a prompt 1236 that prompts the program user account to enter a text string that describes the corresponding program for the program data structure. The graphical user interface also includes a prompt 1238, and a corresponding instruction element 1240 and an instruction element 1242, which request for the program user account to optionally enter a start date and/or end date corresponding to the program data structure. A prompt 1244 may indicate that the instructing of these items of data information may be optional. A cancel button 1248 and a save button 1246 may also enable the program user account to either cancel or save the corresponding data as part of the program data structure.

Figure 13:
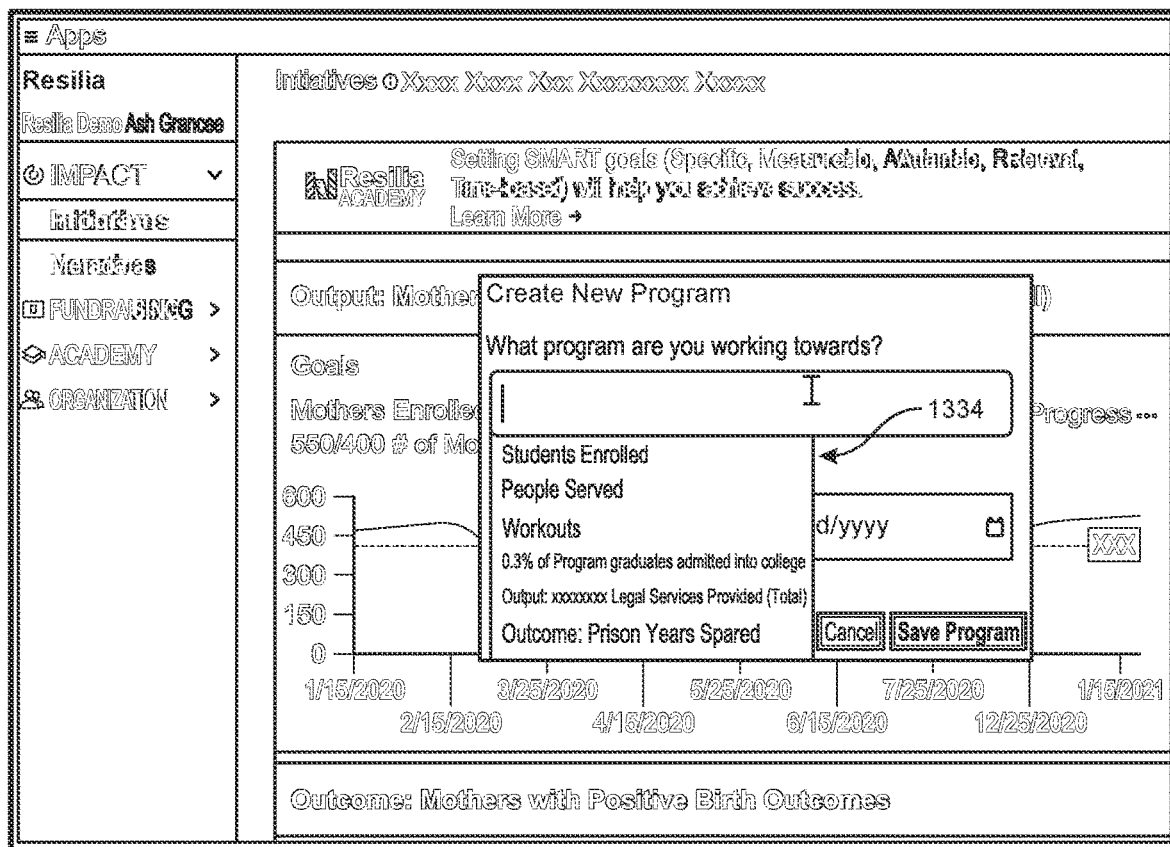
FIG. 13 is a diagram of another example graphical user interface for instructions to complete the program data structure.

FIG. 13 shows another version of graphical user interface 1200. In this example, a program user account has used a cursor to interact with an instruction element where the user may enter the text to describe the name of the program corresponding to the program data structure. In response to this interaction, such as clicking or moving a mouse over, a drop-down menu 1334 may be displayed of pre-populated, pre-existing, or candidate identifiers for corresponding programs with which to complete the corresponding program data structure. Thus, the graphical user interface may facilitate the naming or identifying of the new program, like an interface, when the program user account interacts with the instruction element.

Figure 14:
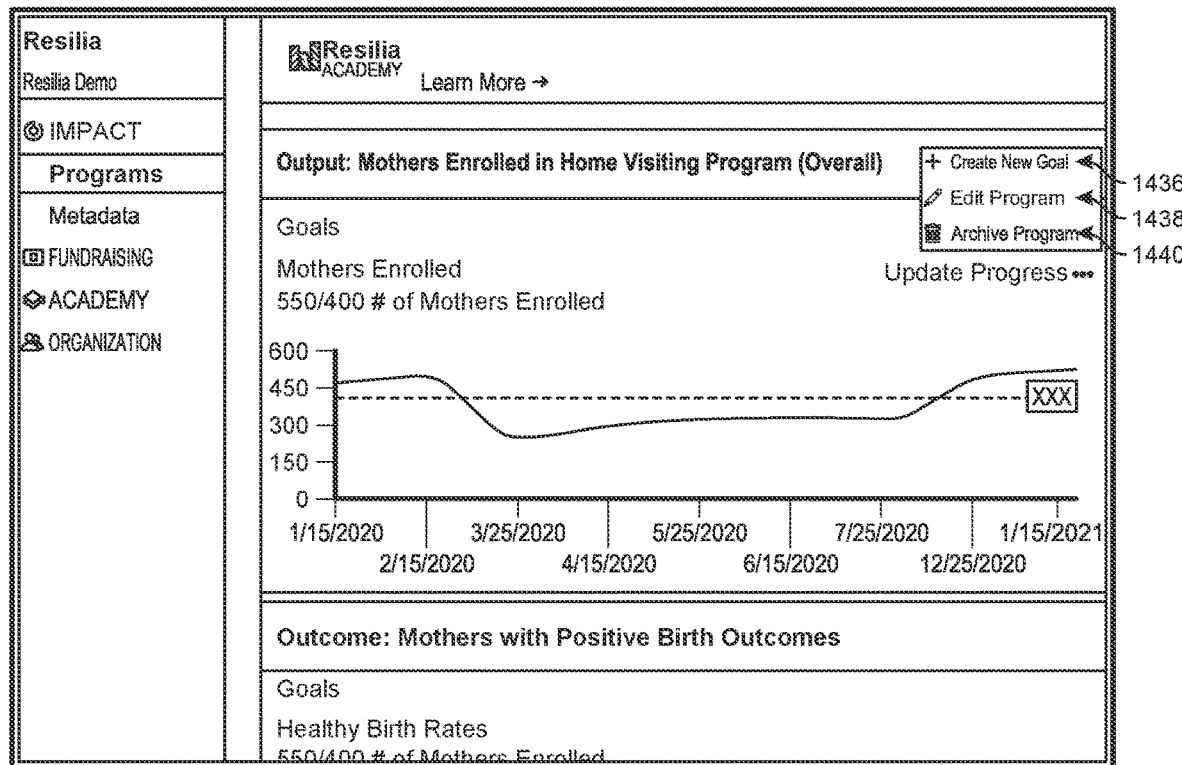
FIG. 14 is a diagram of another example of the graphical user interface for displaying the goal in connection with the program data structure.

FIG. 14 similarly shows another version of the graphical user interface of FIG. 9, where the program user account has toggled an instruction element (e.g., a " . . . " button), thereby triggering a display of options for performing actions in connection with the program data structure. For example, a button 1436, a button 1438, and a button 1440, may enable the user to create a new goal, to provide a program corresponding to a program data structure, and to archive the program, effectively.

Figure 15:
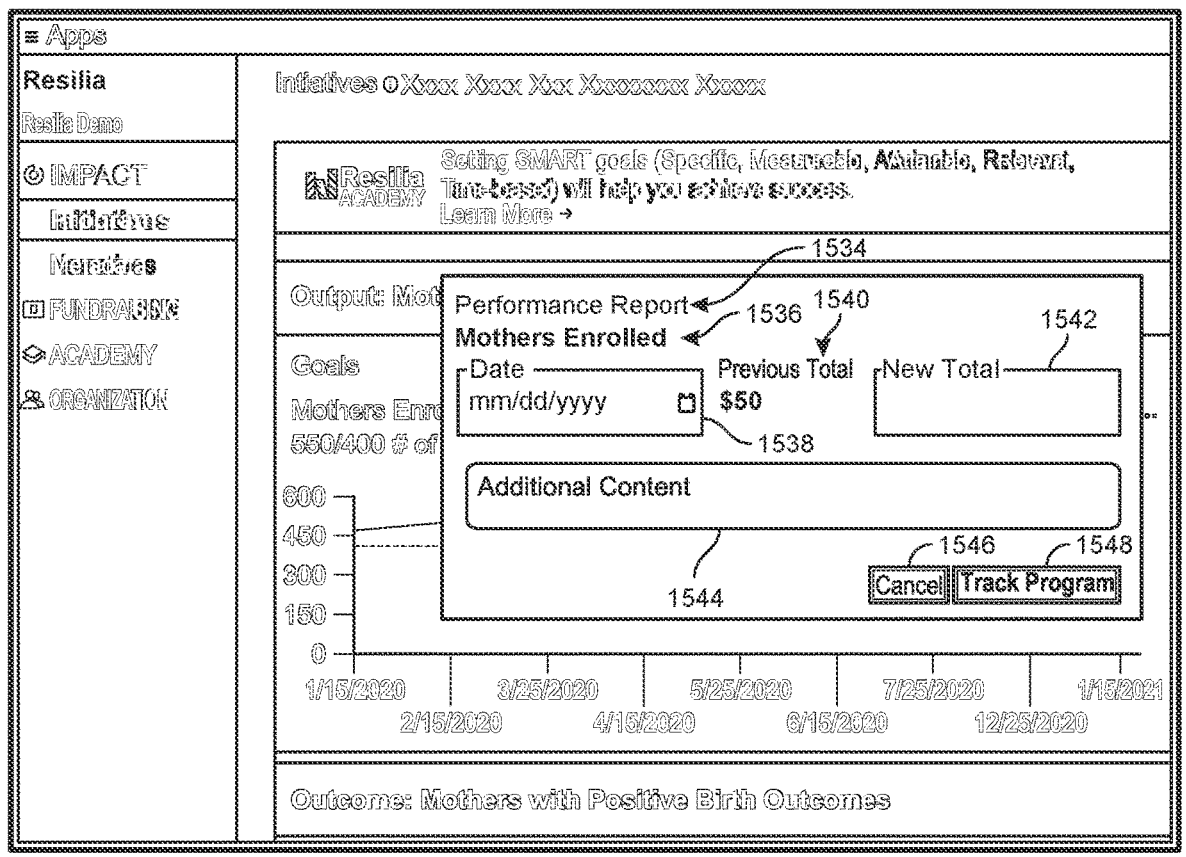
FIG. 15 is a diagram of an example graphical user interface for displaying a performance report in connection with the program data structure.

FIG. 15 shows another version of the graphical user interface of FIG. 9, where the program user account has toggled an element (e.g., an "update progress" button 912 of FIG. 9) to manually, conveniently, and in a user-friendly manner, instruction information to update the historical tracking data corresponding to the goal of the program for this program data structure. This graphical user interface may include a headline 1534 indicating the performance report, a headline 1536 indicating that the data corresponds to a count of mothers enrolled within the program, a headline 1540 identifying a particular value as the previous total, an instruction element 1542 enabling the program user account to enter a new total, as well as an instruction element 1538 enabling the program user account to enter a date corresponding to the newly entered data. The graphical user interface also includes an optional instruction element 1544 for enabling the program user account to enter one or more text strings describing circumstantial or other contextual details regarding the entry of the new data. The graphical user interface also includes a corresponding cancel button 1546 and a track program button 1548 for the entry of the new data.

Figure 16:
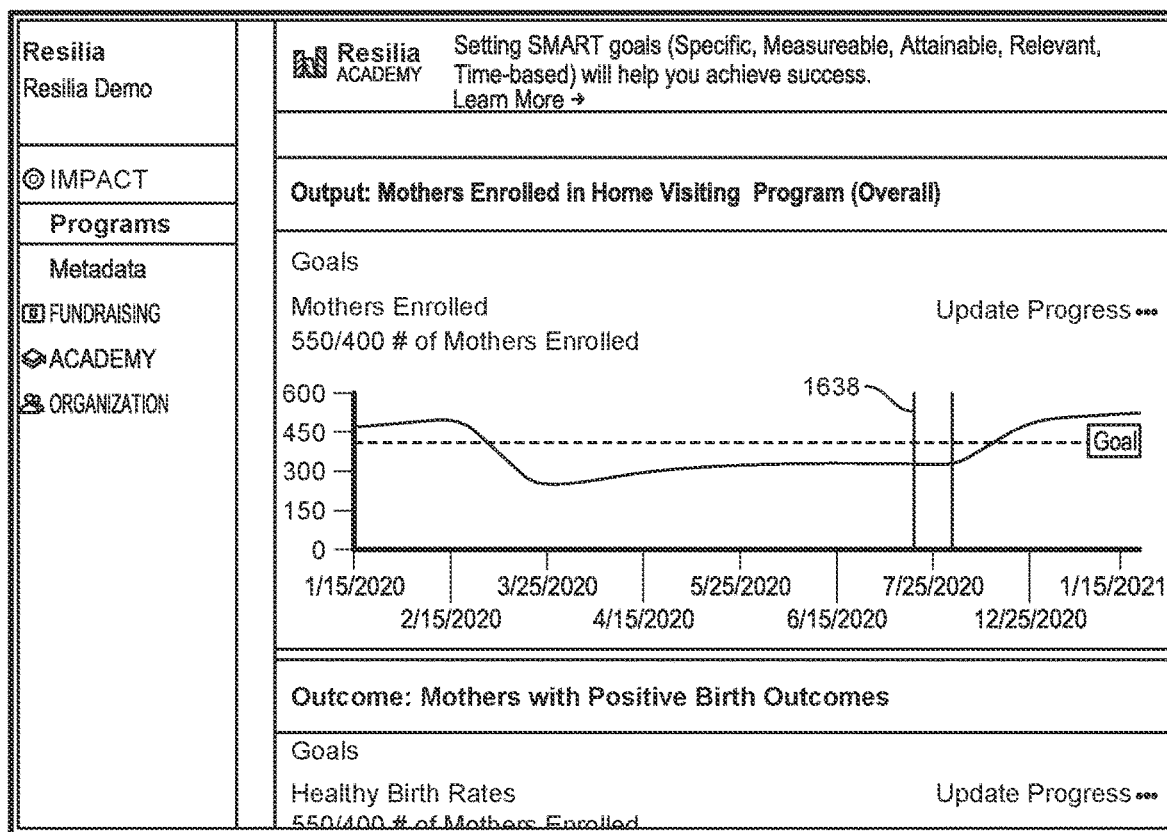
FIG. 16 is a diagram of another example graphical user interface for displaying the performance report in connection with the program data structure.

FIG. 16 shows another version of the graphical user interface of FIG. 9. In this particular example, the graphical user interface has been updated with a bar marker 1638. Bar marker 1638 may mark a position or range along one axis at which point a corresponding metadata instance publication was published, as discussed below further in connection with step 130. Thus, the inclusion of bar marker 1638, in combination with the quantitative data already displayed as part of the graph, together highlights a causal relationship whereby the publication of the metadata publication may have triggered or caused a corresponding impact or improvement in the historical tracking data measuring performance toward achievement of the goal corresponding to the particular graph.

Returning to FIG. 1, at step 130, one or more of the systems described herein may provision a metadata application subcomponent within the group network application that enables the specific program user account to enter rich network data that describes the respective task defined in the database. For example, the provisioning module within the corresponding computing system may perform step 130.

Figure 4:
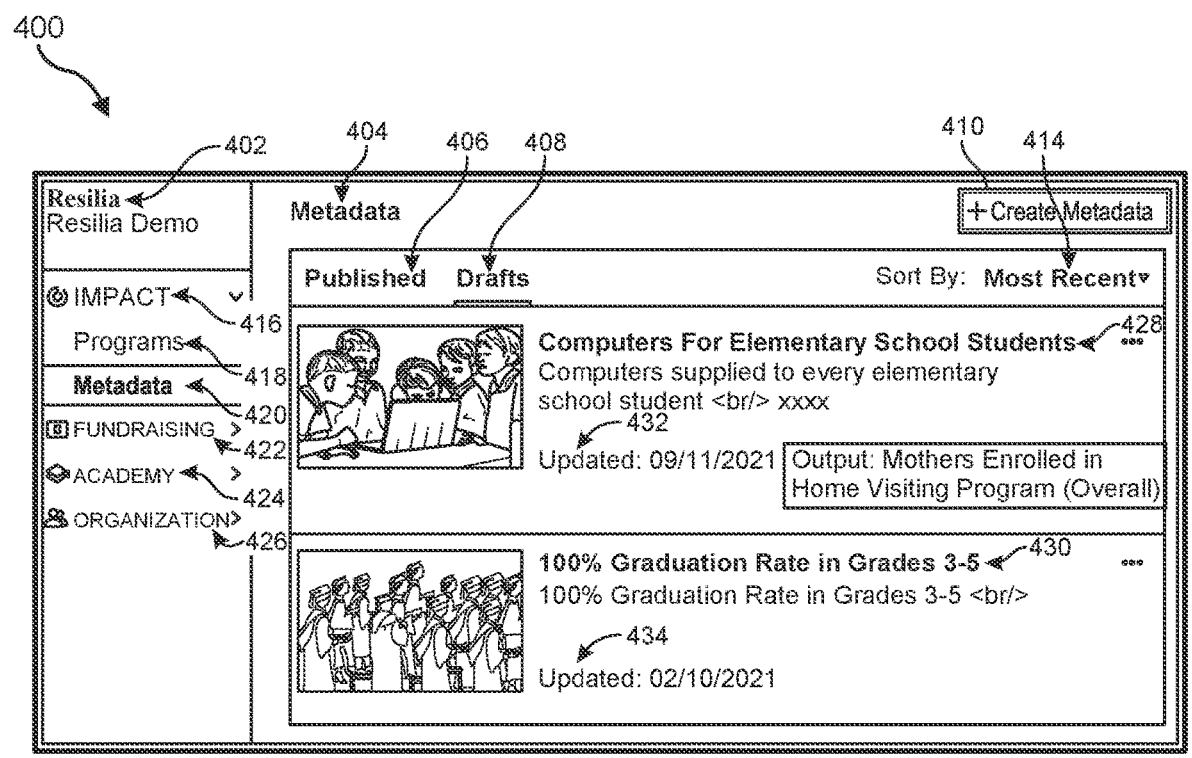
FIG. 4 is a diagram of an example graphical user interface metadata access portal.
Figure 6:
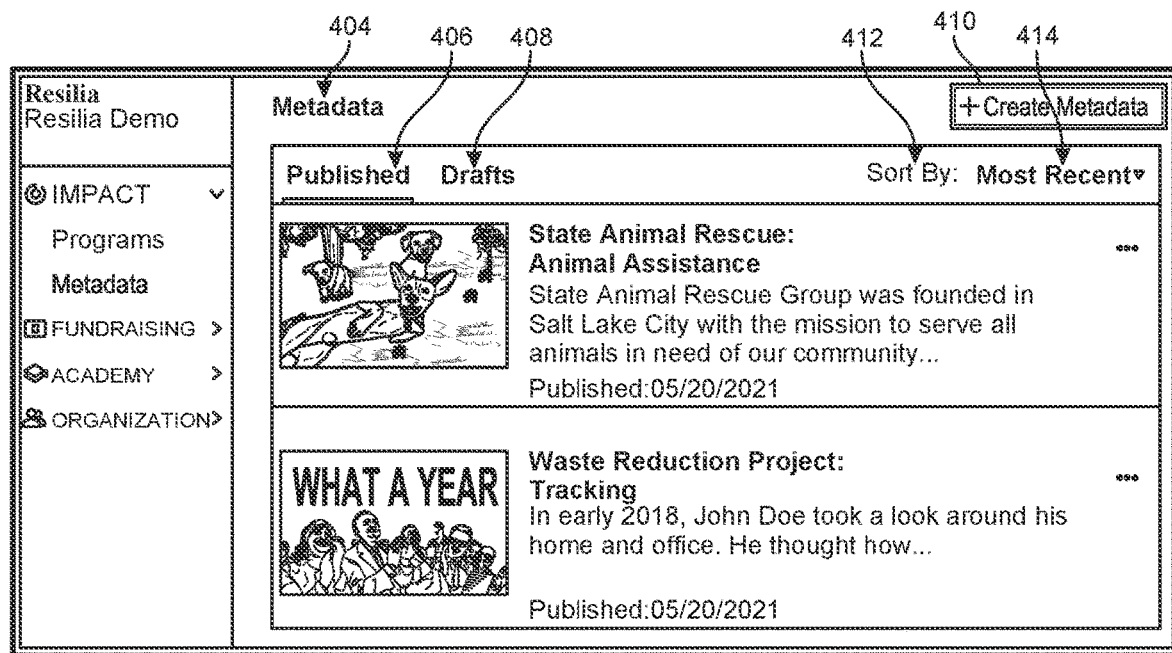
FIG. 6 is another diagram of the example graphical user interface for instructing data to complete the metadata data structure.

Step 130 may be performed in a variety of ways. FIG. 4 shows an illustrative example of a graphical user interface 400, which may include a group network application identifier 402 as well as corresponding navigation buttons 416-426, which enable a navigating program user account to navigate to a corresponding section of the group network application platform. The graphical user interface may include a headline 404 indicating a metadata section of the group network application, a button 406 enabling navigation to a list of published metadata instances, a button 408 enabling navigation to a list of draft or pre-published metadata, a button 414 enabling a user to sort through a list of metadata along one or more dimensions, including chronological sorting, and a button 410 enabling creation of a new metadata data structure, as discussed further below. Moreover, this figure also illustrates how, within the displayed list of draft metadata, the graphical user interface may display a headline 428 and a headline 430 identifying or naming respective metadata, as well as an identifier 432 and an identifier 434, which further identify a calendar date on which the corresponding metadata was updated. Similarly, FIG. 6 shows another version of the graphical user interface of FIG. 4 in which the list of metadata publications that have already been published is displayed, as distinct from the list of draft or pre-published metadata publications.

Figure 5:
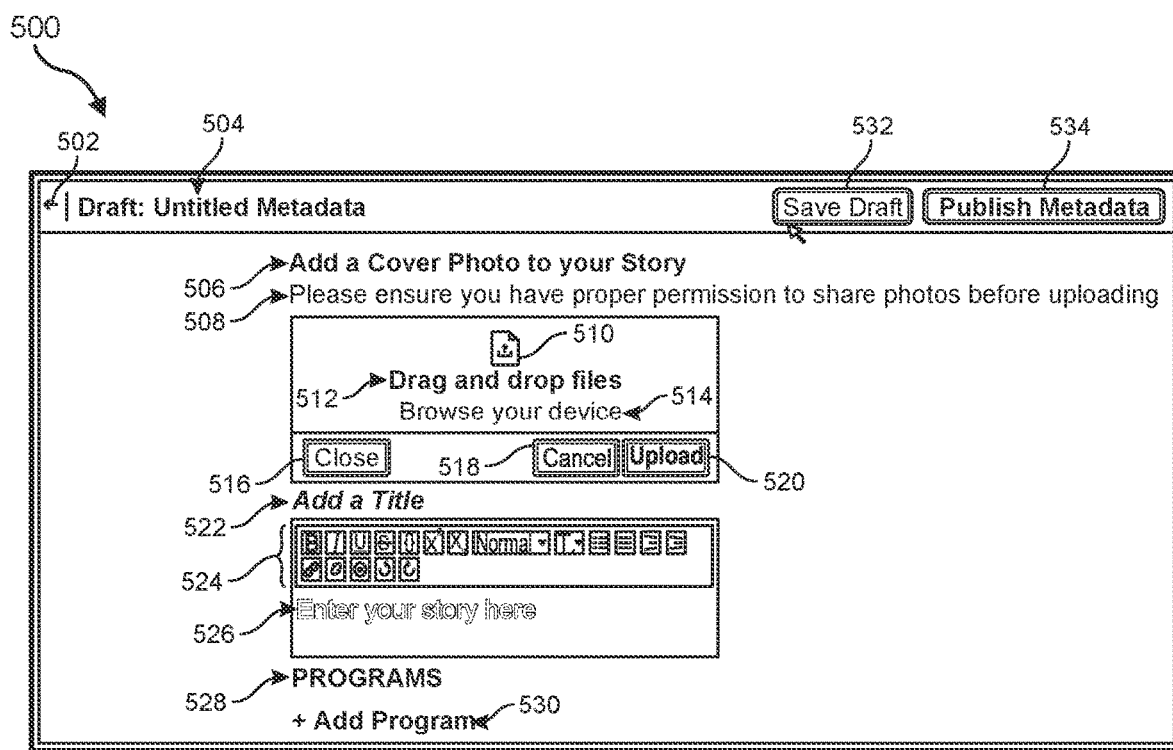
FIG. 5 is a diagram of an example graphical user interface for instructing data to complete a metadata data structure.

FIG. 5 further shows a graphical user interface 500, which may facilitate the program user account entering information to complete a metadata data structure in accordance with step 130. This graphical user interface may have been displayed in response to a program user account toggling button 410 to create a new metadata, as further discussed above. Graphical user interface 500 may correspond to a kind of user interface component, which guides a potentially less sophisticated program user account through the process of completing the corresponding metadata data structure. As further shown in this figure, graphical user interface 500 may include a back button 502, a headline 504 identifying a purpose of the graphical user interface, essay draft button 532, and a publish metadata button 534. The graphical user interface may also include a prompt 506 prompting the program user account data to include a cover photo as part of the story or metadata to be published within the metadata publication in accordance with the metadata data structure. The graphical user interface also includes an advisory warning 508 advising the program user account to please ensure that you have proper permission to share photos before uploading. The graphical user interface also includes an icon 510, a prompt 512, and a button 514 that enable the user to conveniently upload an image file as part of completing the metadata data structure. As further shown in this figure, the subcomponent for uploading the image file may further include a close button 516, a cancel button 518, and an upload button 520.

In addition to the subcomponent, and for uploading the image file, the graphical user interface may further include a subcomponent for adding textual data, as distinct from an image or video data. This subcomponent may further include a prompt 522 prompting the program user account to add a title for the metadata structure. The subcomponent may also include a range 524 of text editing icons for performing respective actions to format text data that has been instruction along one or more dimensions. The subcomponent may further include an instruction element 526 for the program user account to manually or otherwise instruction text data, which may describe the overall program, goal, endeavor, or nonprofit purpose, as further discussed above. Lastly, graphical user interface 500 may include a headline 528 indicating that the user may have one or more programs, as defined according to program data structures, which are further discussed at length above, by toggling a corresponding button or instruction element 530.

Figure 7:
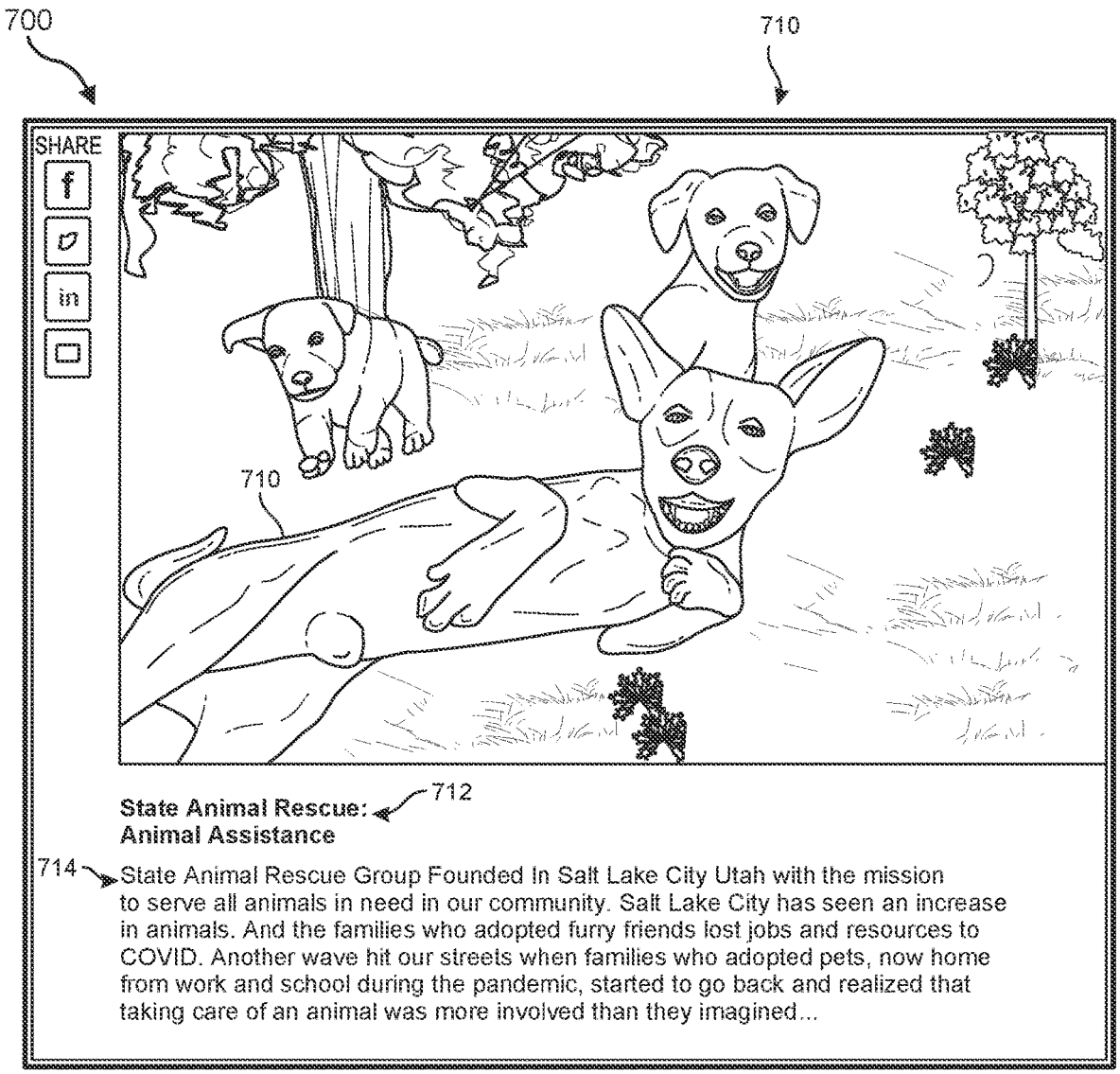
FIG. 7 is a diagram of an example metadata publication for rich network data.

FIG. 7 shows an example graphical user interface 700 that may correspond to a preview or an actual instance of a published metadata publication corresponding to the metadata data structure described above. As further shown in this figure, when published, the metadata publication may include a headline image or graphic 710, a headline or title 712, and at least one paragraph or string of text 714. Each one of these may be instruction by the program user account using a corresponding element of the graphical user interface 500, as discussed at length above.

Figure 8:
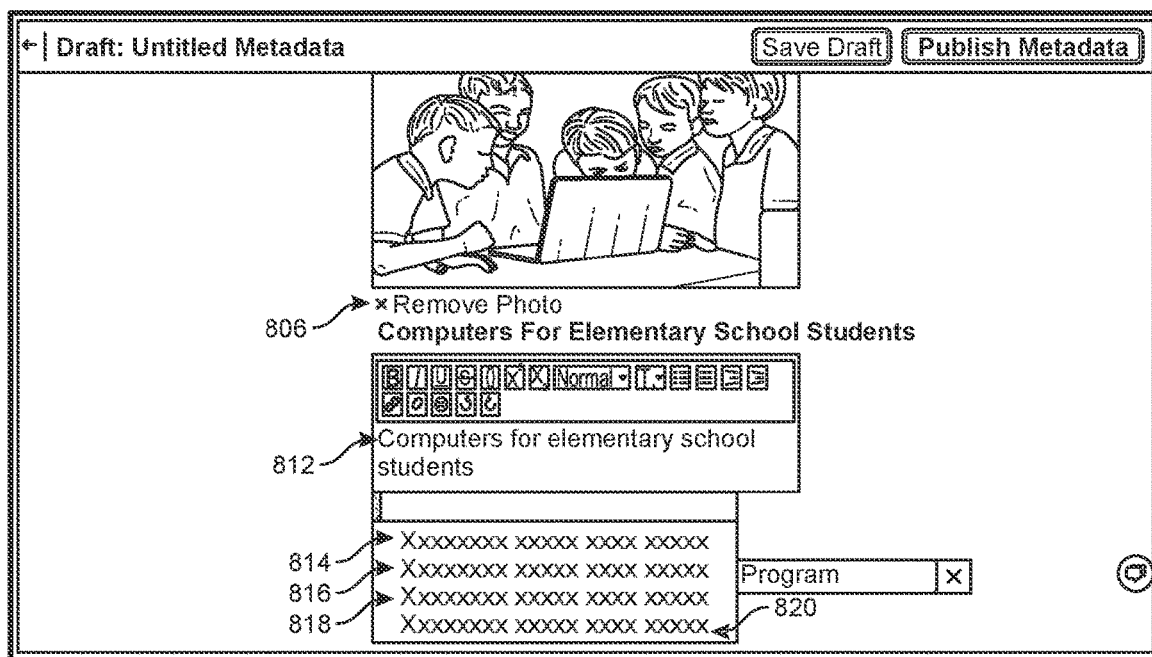
FIG. 8 is another diagram of the example graphical user interface for instructions to complete the metadata data structure.

FIG. 8 shows a graphical user interface 800 as another version of graphical user interface 500 for completing the metadata data structure that sets forth or defines the metadata publication. This figure illustrates a stage of interaction between the program user account and the graphical user interface at which the program user account has already uploaded the headline photo to facilitate the metadata description of the corresponding program. Accordingly, the graphical user interface also includes a button 806 that, when toggled, enables the specific photo to be removed and potentially replaced. This figure also illustrates how prompt or button 522 may have been used by the program user account to enter a particular string of text as a title for the corresponding metadata. Similarly, in response to selection of button 530 to add a program as assigned to the specific metadata instance publication, graphical user interface 800 may display a drop-down list or other list of pre-existing or pre-populated program names or identifiers, similar to the graphical user interface of FIG. 13. Thus, the program user accounts may more conveniently name or identify the particular program currently being assigned to a specific metadata instance publication.

Returning to FIG. 1, at step 140, one or more of the systems described herein may link, within the database of the group network application, and in response to user instruction, the program data structure completed through the program application subcomponent with the rich network data entered through the metadata application subcomponent such that another user account is enabled to view together both quantitative data that measures performance of the respective task in terms of the program data structure and non-quantitative data that describes the respective task defined in the database. For example, a linking module within the corresponding computing system may perform step 140.

Step 140 may be performed in a variety of ways. Generally speaking, step 140 may be performed by linking, within a larger data structure, the program data structure and the metadata data structure. This linking step may facilitate the viewing of both the quantitative data (e.g., the graph of FIG. 9) and the non-quantitative data (e.g., the metadata publication of FIG. 7) more conveniently in sequence, adjacent to each other, and/or as part of the same session within the group network application. In some illustrative examples, the linking of step 140 may facilitate the creation of one or more navigation buttons or instruction elements, such as hyperlinks, that more conveniently enable a viewing user account, such as a resource user account, to navigate from the quantitative data to the non-quantitative data, or vice versa. Additionally, or alternatively, in similar examples the linking of step 140 may facilitate the dynamic creation and insertion of both quantitative data and the non-quantitative data within a same website or other publication such that both items of data may be conveniently viewed simultaneously or as part of the same publication or document.

Thus, the linking of step 140 may enable the group network application to conveniently and dynamically update the metadata publication, and/or a corresponding website or publication (e.g., another website that connects to the metadata publication through a navigation link), by identifying the most current and up-to-date data, which the program user account may have updated through the graphical user interface of FIG. 15, by referencing the larger data structure linking these two items of data together. The larger data structure may specify the location of the quantitative data, which may be extracted and populated into the metadata publication directly or into a corresponding or sister publication or website, which may be interconnected through hyperlinks, as further discussed above.

Figure 10:
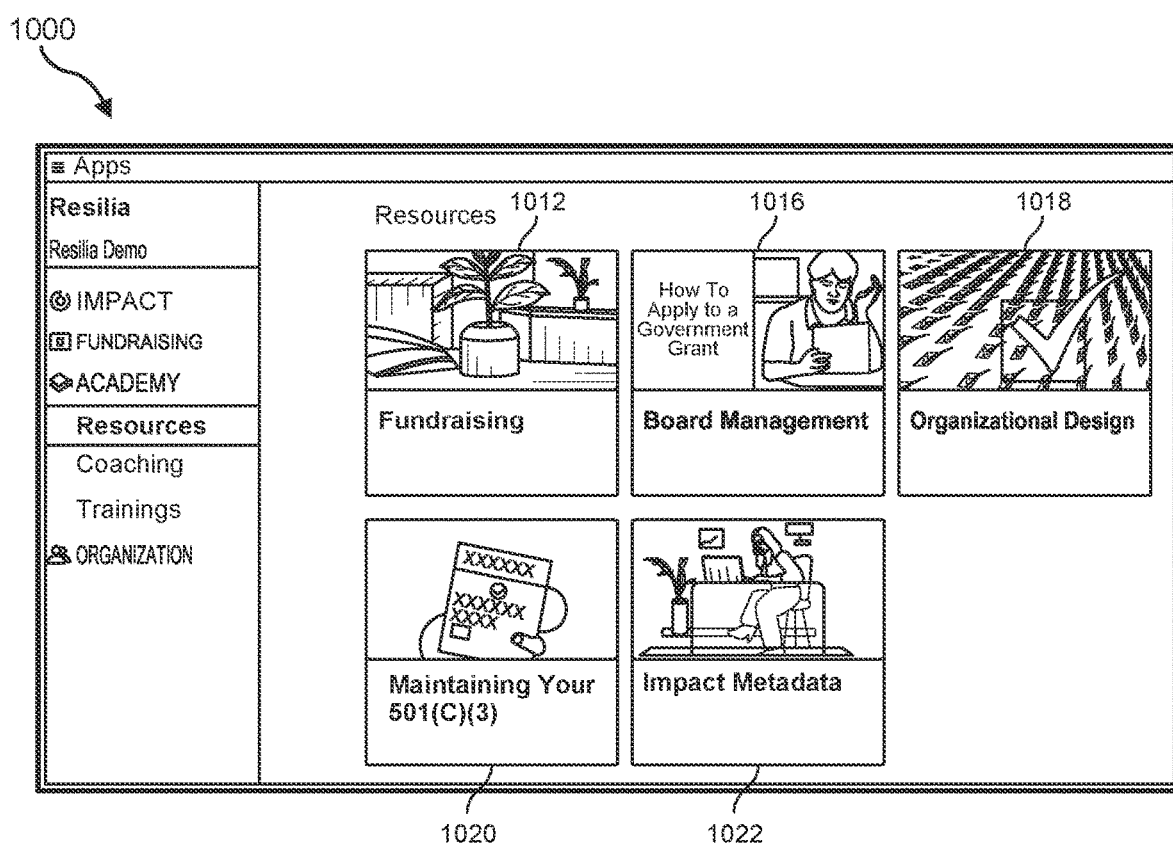
FIG. 10 is a diagram of an example graphical user interface education resource portal.
Figure 11:
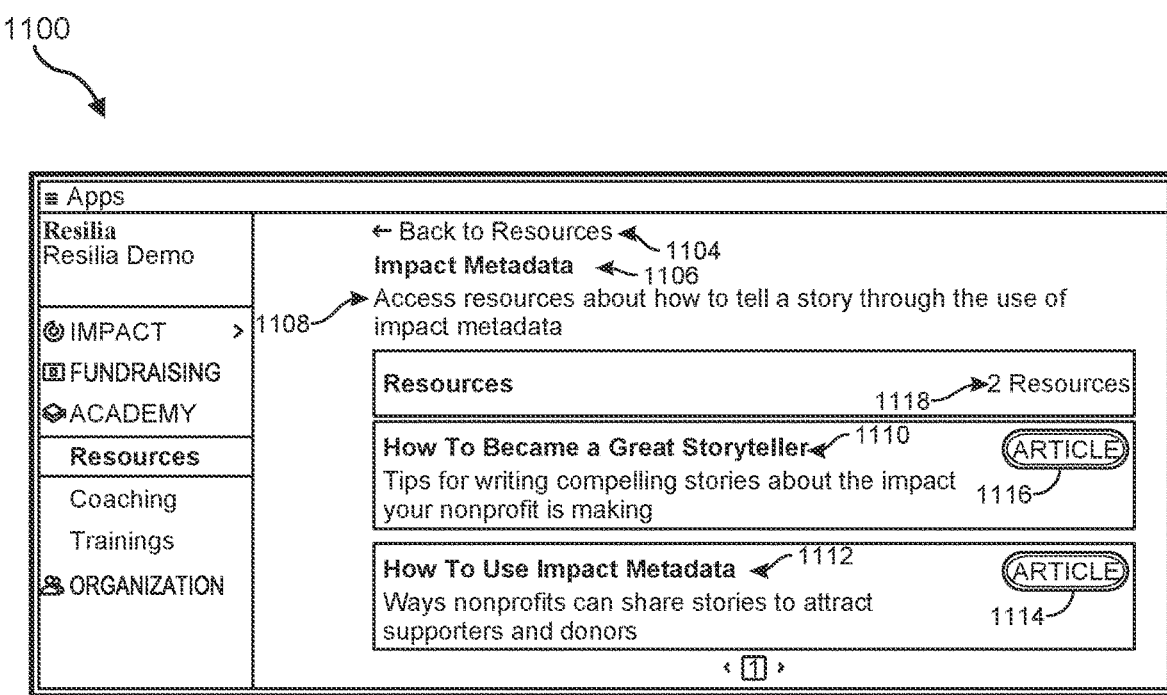
FIG. 11 is a diagram of another example graphical user interface education resource portal in connection with a plurality of metadata data structures.

For completeness, FIG. 10 and FIG. 11 shows how the group network application may provide a comprehensive suite of services to benefit or educate user accounts, including program user accounts and resource user accounts. FIG. 10 shows, within a graphical user interface 1000, a "resource" portal within an academy or education-focused section of the group network application. This portal includes a corresponding icon or button 1012, 1016, 1018, 1020, and 1022, which each, when toggled, trigger navigation to a set of resources for educating or assisting the user account with funding or securing additional supplies of funds, or board management, group or organizational design, maintaining nonprofit or other legal status (e.g., obeying the non-distribution principle), and leveraging the usage of impact metadata, respectfully, as further discussed above.

FIG. 11 shows a related graphical user interface 1100 that provides access to a list of resources relating to impact metadata. Graphical user interface 1100 may be displayed in response to a user account selecting or toggling button 1022 of FIG. 10. Graphical user interface 1100 may include a button 1104 for navigating back to graphical user interface 1000, a headline 1106 identifying that the resources of this interface are associated with impact metadata, a headline 1108 that indicates to the user account that this graphical user interface provides access to resources describing how to tell a story through the use of impact metadata. An indicator 1118 indicates that a total of two resources may be available within this graphical user interface. Similarly, a headline 1110 and a headline 1112 may identify respective titles for articles as resources that may educate the navigating user account about how to become a great storyteller and about how to use impact metadata, as further described above. Similarly, a button 1116 and a button 1114 may enable the user to toggle, navigate to, and read each respective article as a resource.

Figure 2:
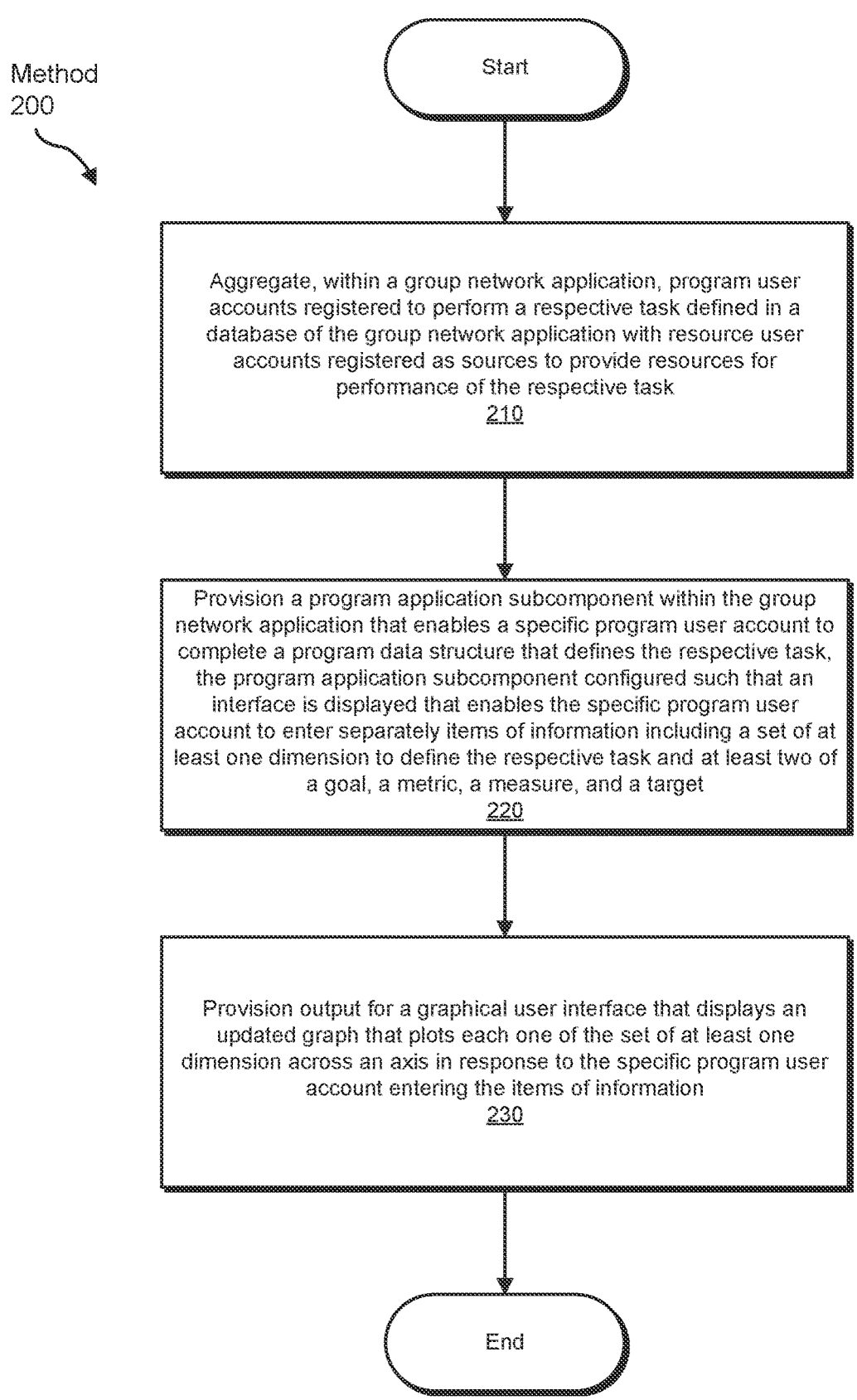
FIG. 2 is a flow diagram of an example method for providing a graphical user interface component.

FIG. 2 shows another flow diagram for an example method 200 which may be performed in addition to, or as an alternative to, the performance of method 100. Method 200 may begin with step 210, which may parallel step 110. From step 110, method 200 may proceed to step 220, at which point one or more of the systems described herein may provision a program application subcomponent within the group network application that enables a specific program user account to complete the program data structure that defines the respective task. The program application subcomponent may be configured such that an interface is displayed that enables the specific program user account to enter separately items of information including a set of at least one dimension to define the respective task and at least two of a goal, a metric, a measure, and a target. For example, the provisioning module within the corresponding computing system described above, such as a backend group network application server, may perform step 210.

Figure 17:
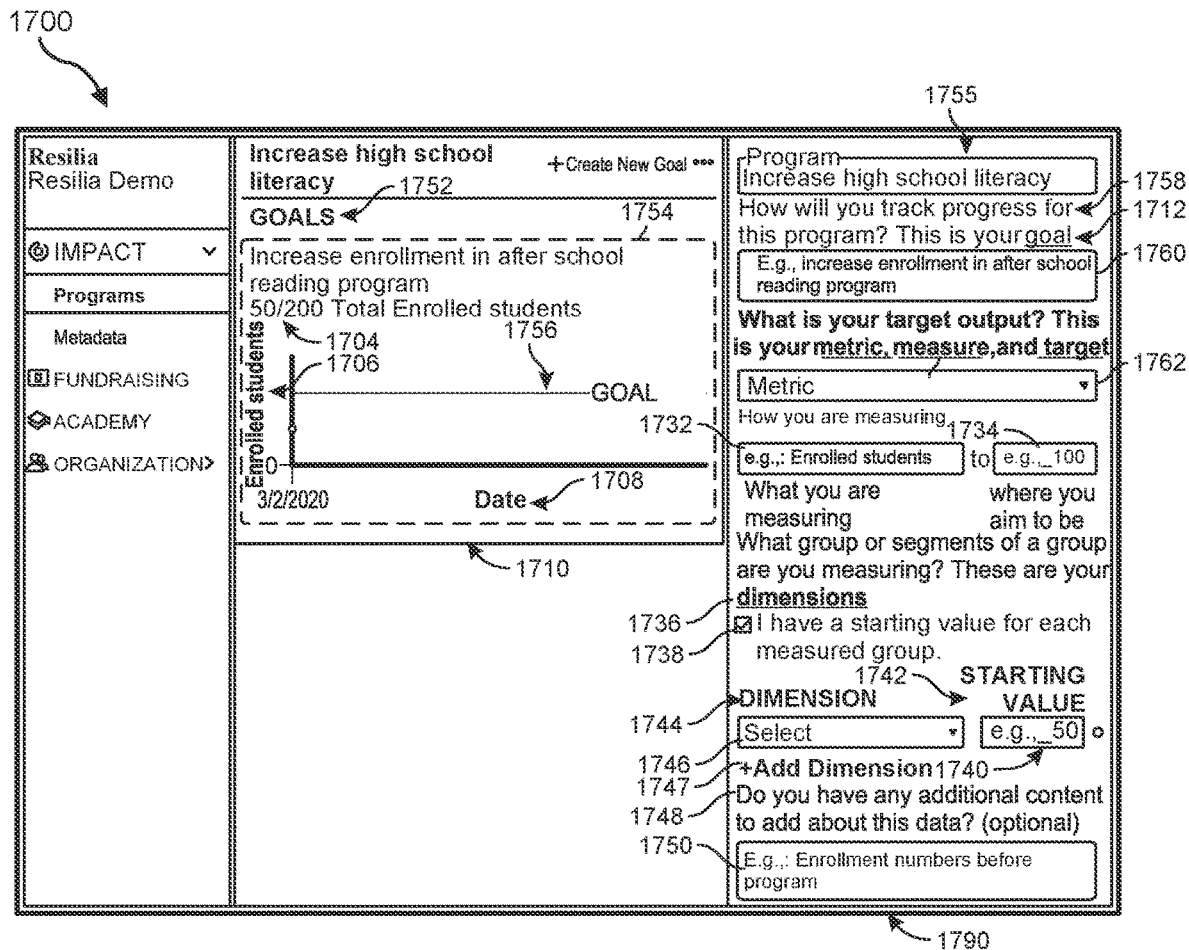
FIG. 17 is a diagram of an example graphical user interface for an interface enabling dynamic instruction of multidimensional data describing performance toward achieving a goal in connection with the program data structure.

Step 210 may be performed in a variety of ways. FIG. 17 shows an example graphical user interface 1700 that may help illustrate the performance of step 210. As further shown in this figure, the graphical user interface may include a headline 1752 indicating "GOALS," and a graph 1754 that plots the performance toward achieving a specific goal. In the example of this figure, a ratio 1704 may indicate that 50 out of 200 students have been enrolled, thereby indicating progress toward a goal of 200 students enrolled in an afterschool reading program. A vertical axis 1706 may provide a metric for counting the number of enrolled students, whereas horizontal axis 1708 may provide a metric for marking a corresponding date or time at which point a matching number of students have actually been enrolled according to the historical tracking data plotted on the graph. A bar 1756 may mark a point along the vertical axis 1706 that corresponds to the goal of 200 students to be enrolled. All of these may visually correspond to a graph subcomponent 1710.

In addition to graph subcomponent 1710, graphical user interface 1700 may also include an interface subcomponent 1790 that guides a program user account through the process of completing the program data structure described above. Thus, as the program user account proceeds to enter items of information within various ones of the fields of interface subcomponent 1790, the graph within graph subcomponent 1710 may be dynamically updated in real time or otherwise updated, thereby displaying data or changes to data that correspond to the instruction from the program user account.

Interface subcomponent 1790 may include a program header or instruction element 1755 at the top, which may identify, using a text string, a name or identifier of the corresponding program to which the specific goal for the graph is assigned. In the example of this figure, the program may correspond to increasing high school literacy, and the corresponding goal that helps facilitate increasing high school literacy may constitute increasing enrollment in after school reading programs, as discussed above. Interface subcomponent 1790 may also include a prompt 1758, which requests for the user to track progress for the corresponding program, and a prompt 1712, which further specifies to the program user account the particular textual identifier or descriptor for the goal corresponding to graph subcomponent 1710. An instruction element 1760 may enable the program user account to manually or otherwise instruction the particular textual identifier or descriptor for the goal. Below instruction element 1760 there may be another prompt, which may ask the program user account "what is your target output?" The prompt may further indicate to the program user account that "this is your metric, measure, and target." The words "metric," "measure," and "target," as well as "dimensions," may correspond to tooltip pop-up notifications that, when interacted with by a cursor, may trigger the displaying of the tooltip pop-up notifications. Rather than tooltip pop-up notifications, the corresponding words may function as hyperlinks or other interactive elements that otherwise display the helpful information to the program user account. Moreover, these notifications may further provide an explicit definition for the user of what each term "metric," "measure," and "target" means precisely and specifically, and/or the differences between them, in the context of establishing a goal for research provisioning within this group network application.

As discussed above, interface subcomponent 1790 may conveniently educate and inform the user regarding the precise definitions and meanings of the terms "metric," "measure," and "target," thereby enabling the program user account to more accurately instruction information into corresponding fields of the interface subcomponent 1790 in order to complete or further define the corresponding program data structure. Thus, graphical user interface 1700 may correspond to an improved, more robust, and/or more comprehensive form of the program creation interface from FIG. 12. An instruction element 1762 may enable the program user account to specify (through a dropdown menu or text string instruction) a metric in connection with the goal of the graph subcomponent 1710. The metric may correspond to an indication of what the program user account is measuring. Similarly, an instruction element 1732 may enable the program user account to specify a value or text string that specifies the measure, which may correspond to what the program user account is measuring. Furthermore, an instruction element 1734 may enable the program user account to specify a target, which may correspond to an indication of where the program user account aims to be in connection with the goal.

Additionally, graphical user interface 1700 also enables the program user account to add, insert, specify, and/or define one or more dimensions, as indicated by headline 1736. In some examples, these dimensions may correspond to groups or segments of a group that the program user account is measuring. An instruction element 1738 may enable the program user account to toggle an indication of whether the program user account has a starting value for each measured group or dimension. In the example of this figure, instruction element 1738 has been toggled.

To enable the program user account to specify one or more dimensions, graphical user interface 1700 may include a headline 1744 indicating "DIMENSION" and a headline 1742 indicating "STARTING VALUE." Thus, in some examples, both an indication of a dimension and an indication of a starting value may be entered as a linked pair into the data for the graph subcomponent 1710 (e.g., when instruction element 1738 has been toggled). Below these headlines, an instruction element or button 1747 may enable the user to press or interact with the button 1747 and thereby provide another dimension on top of any dimensions that have already been added within interface subcomponent 1790. An instruction element 1746 may enable the program user account to specify a particular dimension (e.g., a cohort of individuals), and a corresponding instruction element 1740 may enable the program user account to specify which particular value is the starting value. A prompt 1748 may prompt the program user account to indicate whether the program user account has any additional content to add about the particular data being entered, and the prompt further indicates that this additional content is optional. An instruction element 1750 may provide a field for the user to enter textual content in response to prompt 1748.

Figure 18:
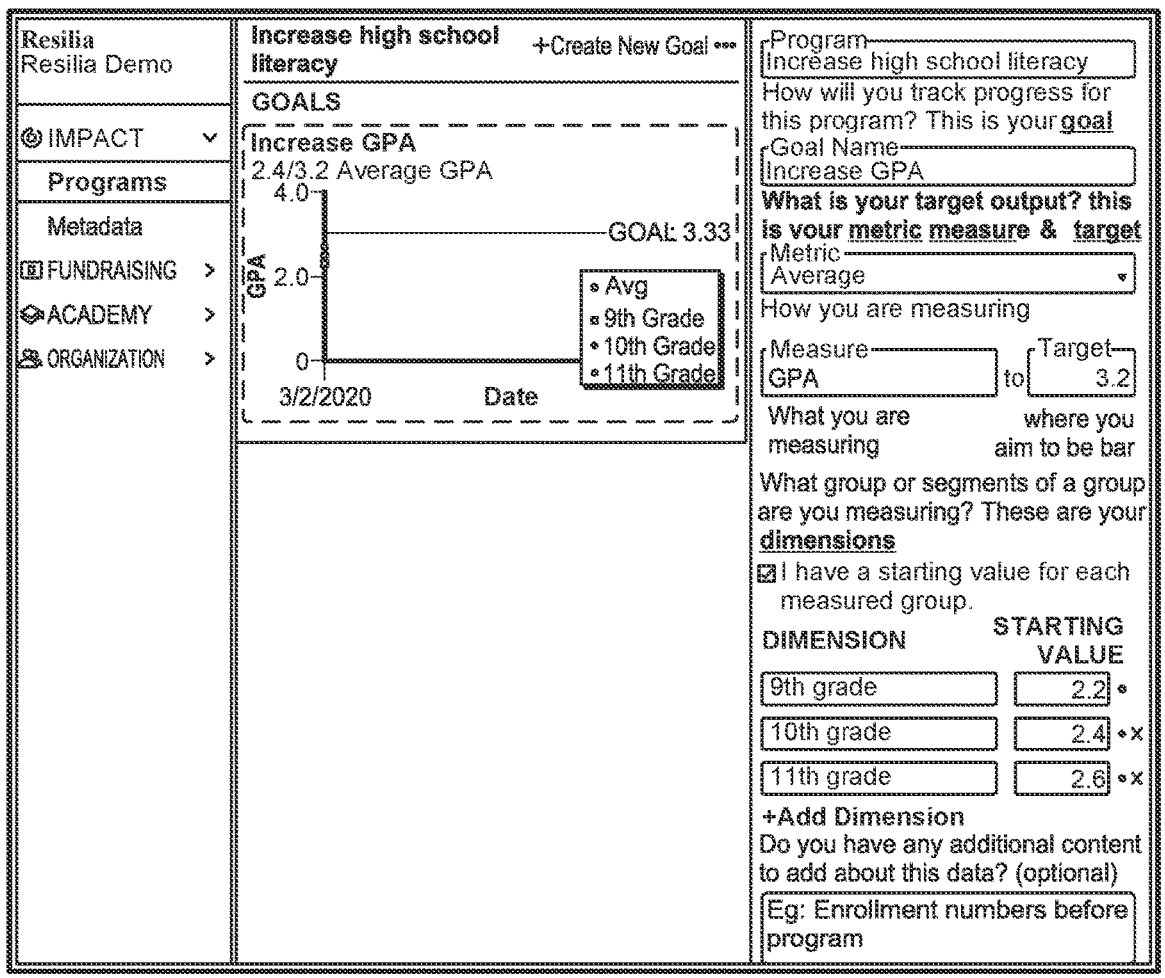
FIG. 18 is another diagram of the example graphical user interface for the interface enabling dynamic instruction of multidimensional data describing performance toward achieving the goal in connection with the program data structure.

FIG. 18 shows a graphical user interface 1800, which corresponds to another version of graphical user interface 1700. In this example, the graph subcomponent is plotting data responding to a goal of increasing GPA. Graphical user interface 1800 also further illustrates how the program user account interacts with the interface subcomponent to add three dimensions, which correspond to a ninth grade cohort of students, a tenth grade cohort of students, and an eleventh grade cohort of students. In this example, the dimension cited by the program user account corresponds to cohorts of individuals, but in other examples the dimension may correspond to any suitable variable for tracking in accordance with method 100 and/or method 200 in the context of resource provisioning, as further discussed above.

Figure 19:
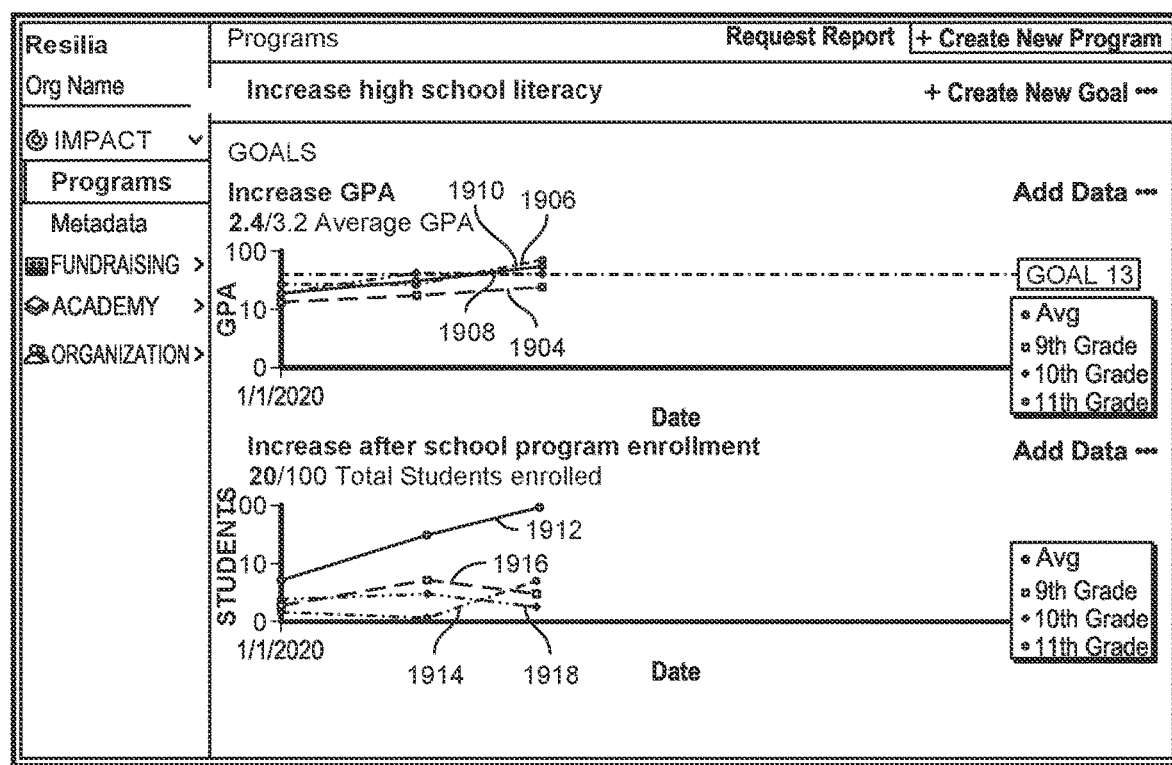
FIG. 19 is a diagram of an example graphical user interface for displaying a set of graphs corresponding to multiple goals assigned to the program data structure.

FIG. 19 shows a graphical user interface 1900, which corresponds to an updated version of graphical user interface 900 of FIG. 9 for displaying graphs associated with specific programs. In contrast to graphical user interface 900, which only tracked a single variable or dimension corresponding to curving line 930, graphical user interface 1900 shows multiple graphs that each plot multiple lines, including lines 1904-1918. In particular, graphical user interface 1900 shows a graph on the top that corresponds to the goal of increasing GPA, as discussed above in connection with FIG. 18, and also a graph on the bottom that corresponds to the goal of increasing student enrollment, as discussed above in connection with FIG. 17. Both of these goals have been assigned or associated with the overall program of increasing high school literacy, as further indicated by the headline of the top of graphical user interface 1900.

Graphical user interface 1900 also has inserted an additional line as an average of the remaining lines, and as distinct from the lines corresponding to each cohort in each graph. Thus, both the top graph and the bottom graph include three lines for the three respective cohorts or dimensions, respectively, and also include a fourth line that corresponds to a respective average of the three cohorts in each graph. Each of these lines may optionally be drawn or displayed in a separately distinct color, which may be further indicated or designated by the legend for each graph.

Although various individual features of FIGS. 17-19, in isolation, may have a superficial similarity to other systems, the overall combination of features is carefully tailored, as an interface, to carefully guide and educate a program user account, which may correspond to an individual who is not technically sophisticated but who is sophisticated in the realm of nonprofit programs and resource provisioning, in entering data within the innovative group network application of method 100 that brings together program user accounts and resource user accounts, thereby enabling other user accounts, such as resource user accounts to more efficiently, conveniently, and comprehensively view and understand data describing the progress of the corresponding program. These program user accounts may not otherwise understand what the specific items of information requested in FIG. 17 actually are, how they are defined, or why they are important to specify. These individuals also may not possess the technical sophistication to use more technically challenging, cumbersome, and/or comprehensive or general-purpose applications for entering data within a professional database, such as a SQL database. Such individuals may prefer to enter data manually through a web or mobile interface, and to enter such data monthly, rather than curating more sophisticated professional databases and then uploading corresponding files on a daily basis. Thus, graphical user interface 1700 represents a convenient, web-enabled or mobile device enabled, streamlined, and/or user-friendly interface that specifically educates and requests the specific and narrow set of items of information that have the most educational and metadata impact in the context of a group network application for resource provisioning. Along these lines, graphical user interface 1700 is based on extensive research and development by interacting with specific individuals corresponding to program user accounts to ascertain which designs, features, and/or fields are most useful and impactful for these individuals when seeking resource provisioning to support their efforts to achieve goals and complete programs.

Method 200 may also include a step 230, at which point one or more of the systems described herein may provision output for a graphical user interface that displays an updated graph that plots each one of the set of at least one dimension across an axis in response to the specific program user account entering the items of information. Step 230 may be performed by the provisioning module described above. The descriptions of FIGS. 17-19 have already illustrated the performance of step 230.

In addition to method 100 and/or method 200, or an alternative to method 100 and/or method 200, this application also discloses new and innovative gating technology. Gating technology may have been used in related systems to limit access to one or more features of a platform, based on rules, until one or more conditions has been satisfied, such as upgrading a subscription or payment plan. Nevertheless, group network application technology and corresponding gating methodologies have not been previously applied to the context of resource provisioning for the achievement of programs with separate sets of program user accounts and resource user accounts interacting together, as further discussed above. Accordingly, as the concept of gating technology is applied to the group network application technology of method 100 and method 200, new possibilities emerge in terms of how this gating technology may be applied.

FIG. 20 shows a graphical user interface 2000 that applies gating technology to limit access to views of resource user accounts. This graphical user interface may display sets of information corresponding to respective resource user accounts. For example, a headline 2008 may identify a specific resource user account. In this particular example of this figure, the resource user account corresponds to a charitable foundation. Program user accounts may browse through such sets of information, which may be sorted or indexed in at least two different manners, as indicated by instruction elements 1214. Graphical user interface 2000 further provides an instruction element 2002, which program user accounts may select or toggle to thereby upgrade a subtraction repayment plan with the group network application and thereby gain access to more views of such sets of information corresponding to resource user accounts.

Figure 21:
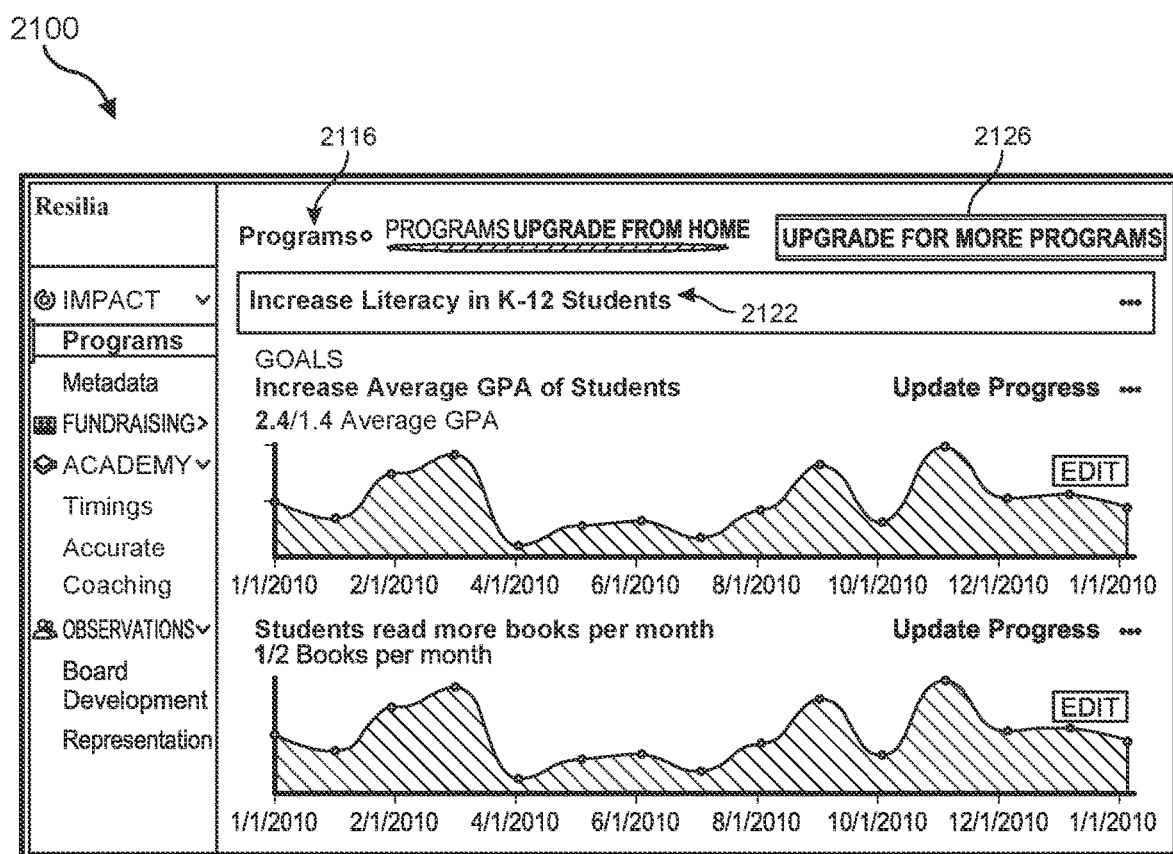
FIG. 21 is a diagram of an example graphical user interface for limiting access to displays of graphics corresponding to program data structures in accordance with a gating model.

Similarly, FIG. 21 shows another graphical user interface 2100 that parallels, in some ways, graphical user interface 2000. In contrast to graphical user interface 2000, however, graphical user interface 2100 displays a list of sets of information corresponding to various programs, as defined by program data structures, and as further discussed above in connection with method 100. Thus, graphical user interface 2000 may provide a view for other user accounts, including especially resource user accounts, to learn about and be exposed to various programs that program user accounts have publicized or otherwise made available within the group network application for resource provisioning. As further shown in this figure, graphical user interface 2100 may include a headline 2116 indicating "Programs," an instruction element 2126 enabling the viewing user account to upgrade a subscription or other payment plan in order to gain access to viewing more sets of information regarding programs, and a headline 2122 describing a specific program for increasing literacy. In this way, graphical user interface 2000 parallels some aspects of graphical user interface 900 of FIG. 9, but nevertheless applies, in a novel and innovative manner, gating technology, which has not previously been applied to the specific innovative features (e.g., access to descriptions of funders or resource user accounts, access to descriptions of programs and corresponding program data structures, etc.) of the resource provisioning group network application described in this application.

Figure 22:
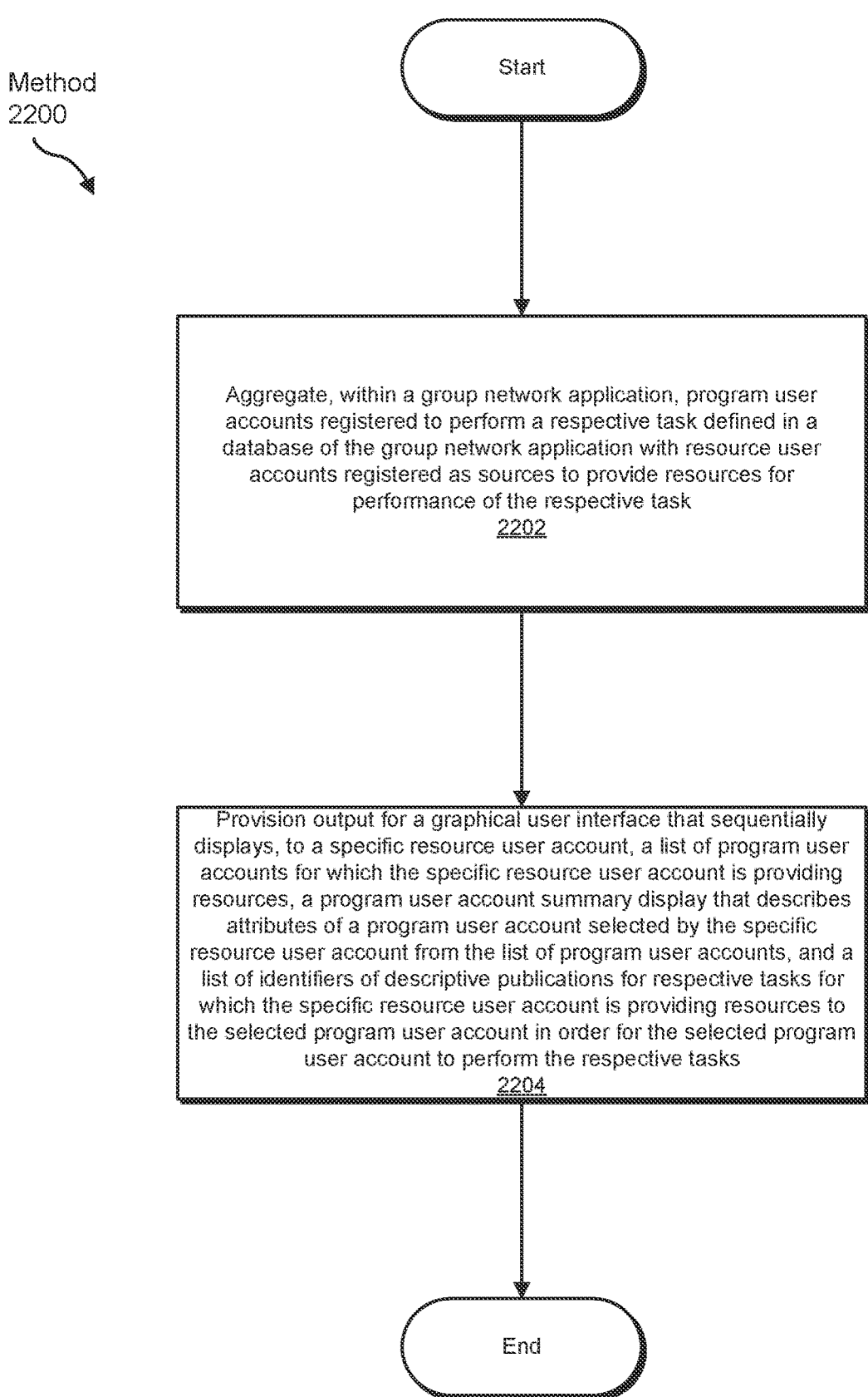
FIG. 22 is a flow diagram of an example method for operating an impact intelligence dashboard.

FIG. 22 shows a flow diagram for a method 2200 for providing an impact intelligence dashboard for resource user accounts, as discussed further below. At step 2202, one or more of the systems described herein may aggregate, within a group network application, program user accounts registered to perform a respective task defined in a database of the group network application with resource user accounts registered as sources to provide resources for performance of the respective task. For example, an aggregation module within a corresponding set of modules as part of a software system may perform step 2202. Generally speaking, the performance of step 2202 may parallel the performance of step 110 of FIG. 1 and step 210 of FIG. 2, as further discussed above.

Returning to FIG. 22, at step 2204, one or more of the systems described herein may provision output for a graphical user interface that sequentially displays, to a specific resource user account, a list of program user accounts for which the specific resource user account is providing resources, a program user account summary display that describes attributes of a program user account selected by the specific resource user account from the list of program user accounts, and a list of identifiers of descriptive publications for respective tasks for which the specific resource user account is providing resources to the selected program user account in order for the selected program user account to perform the respective tasks. For example, at step 2204, a provisioning module within a corresponding set of modules for a software system may perform step 2204. In some examples, the provisioning module that performs step 2204 may correspond to the provisioning module that performs steps 120-130 of FIG. 1 and steps 220-230 of FIG. 2, as further discussed above.

Figure 23:
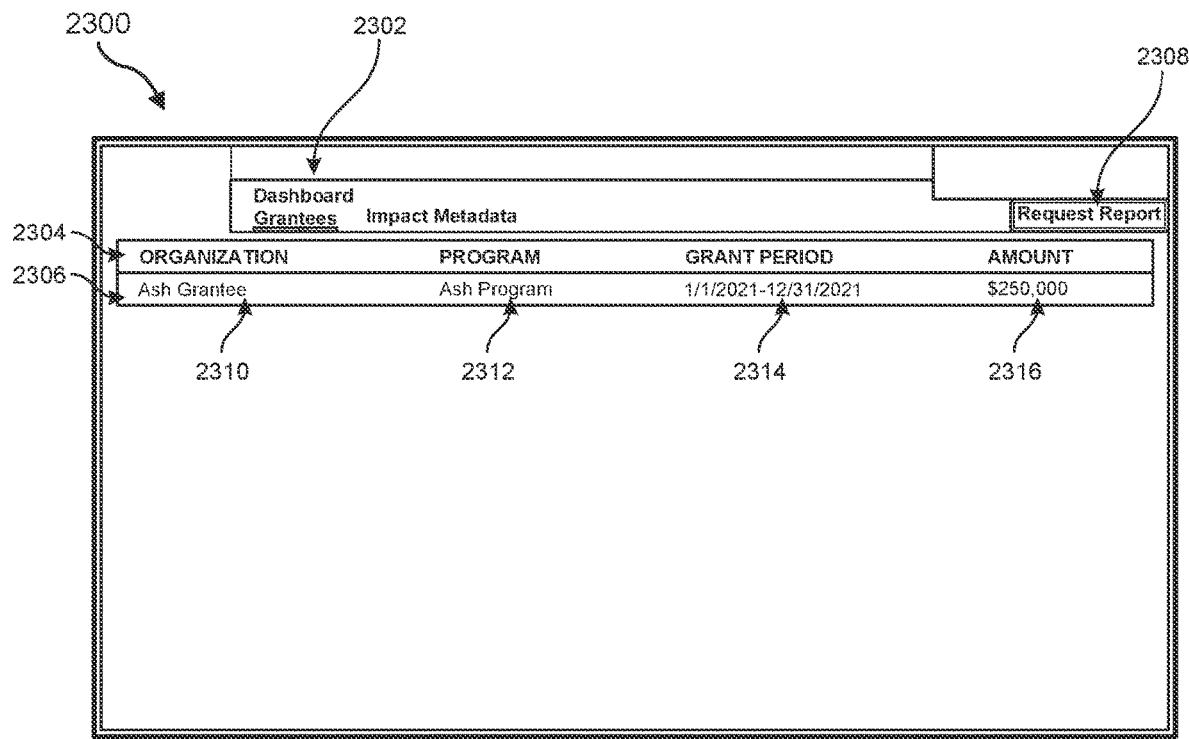
FIG. 23 is a diagram of a graphical user interface for selecting a program user account about which to retrieve intelligence.

The provisioning module may perform step 2204 in a variety of ways. FIG. 23 shows an illustrative graphical user interface that may correspond to performance of method 2200. In particular, this figure shows a graphical user interface 2300 that may correspond to an initial stage of the performance of method 2200. As further shown in this figure, graphical user interface 2300 may provide an impact intelligence dashboard for resource user accounts within the group network application. Accordingly, graphical user interface 2300 may indicate the perspective of a resource user account for a user who provides resources to respective program user accounts, as distinct from the perspective of the program user accounts themselves (e.g., the perspective of program user accounts as shown in some of FIGS. 1-21). These resource user accounts may desire a high level overview of the program user accounts to which they are providing funding, descriptions of the groups or organizations that are represented by these program user accounts, and/or descriptions of initiatives or program data structures for corresponding tasks that are assigned to the groups or organizations. FIG. 23 helps to illustrate how a resource user account may conveniently access an impact intelligence dashboard, in the form of graphical user interface 2300, such that the resource user account may enjoy a streamlined view of one or more of these items of information.

FIG. 23 further shows how graphical user interface 2300 may include a dashboard headline 2302 that identifies graphical user interface 2300 as corresponding to an impact intelligence dashboard for the benefit of the resource user account. As further shown in this figure, graphical user interface 2300 may include a graphical user interface element that toggles between a list of "grantees" or program user accounts, on the one hand, and "impact metadata" or "impact narratives" on the other hand. The graphical user interface element may toggle from the grantee position to the impact metadata position in response to a specific resource user account selecting a particular program user account (e.g., "Ash Grantee"), or in response to the resource user account selecting the graphical user interface element itself, as further discussed below.

Graphical user interface 2300 may further include a row 2304, as part of a larger table of row(s) and/or column(s), and row 2304 which may further display the following respective column headings: "ORGANIZATION" or program user account, "PROGRAM" or initiative, "GRANT PERIOD" or granting window of time, and/or "AMOUNT." Similarly, graphical user interface 2300 may further display a row 2306 as part of the same table, and this row 2306 may specify corresponding values for each of the respective attributes or variables identified by the headlines within row 2304. Accordingly, in the example of this figure, row 2306 may specify the value "Ash Grantee" as the identifier or name for the corresponding organization or program user account in the "ORGANIZATION" column 2310. Similarly, row 2306 may specify the value "Ash Program" as the identifier or name for the corresponding program or initiative in the "PROGRAM" column 2312. Furthermore, row 2306 may specify the value "1/1/2021-12/31/2021" as an arbitrary (e.g., for the purposes of illustration) example of a window of time, under the "GRANT PERIOD" column 2314, during which the specific resource user account provides resources or funds for the corresponding organization (i.e., "Ash Grantee"). Lastly, as another example, row 2306 may specify the value "$250.00" as the amount of resources or funds provided to the corresponding program user account within the "AMOUNT" column 2316. FIG. 23 also illustrates another valuable feature of graphical user interface 2300, which is the request report button 2308. Request report button 2308 may correspond to a graphical user interface element that, when toggled by a user account (e.g., a specific resource user account), may enable the user account to request a report on one or more specified variables or requested items of data, as discussed below in more detail in connection with FIG. 26.

Notably, the example of FIG. 23 only shows a row 2306 corresponding to a single organization or program user account, "Ash Grantee," as having a corresponding program (i.e., "Ash Program") that is receiving funding from the specific resource user account that is viewing graphical user interface 2300. Nevertheless, in another example, the specific resource user account may perceive, within graphical user interface 2300, a variety or a multitude of rows, similar to 2306, where each new row shows a different combination of organization and program than the combination of organization ("Ash Grantee") and program ("Ash Program") for row 2306. For example, another illustrative example of a different organization may be the "American Red Cross." Or another illustrative example of a different program may be "Blood Donation Drive in the Congo," which may correspond to a program data structure for a respective task performed by a program user account or corresponding organization such as the "American Red Cross." Similarly, for each one of these additional rows in this hypothetical example, "GRANT PERIOD" column 2314 may specify a corresponding window of time during which the specific resource user account is providing resources or funding, and "AMOUNT" column 2316 may specify a corresponding amount of resources or funding that is being provided by the specific resource user account. Thus, in this manner, graphical user interface 2300 may display a list of program user accounts, including for example "Ash Grantee," that are receiving resources or funding from the specific resource user account that is viewing or interacting with the graphical user interface.

Figure 24:
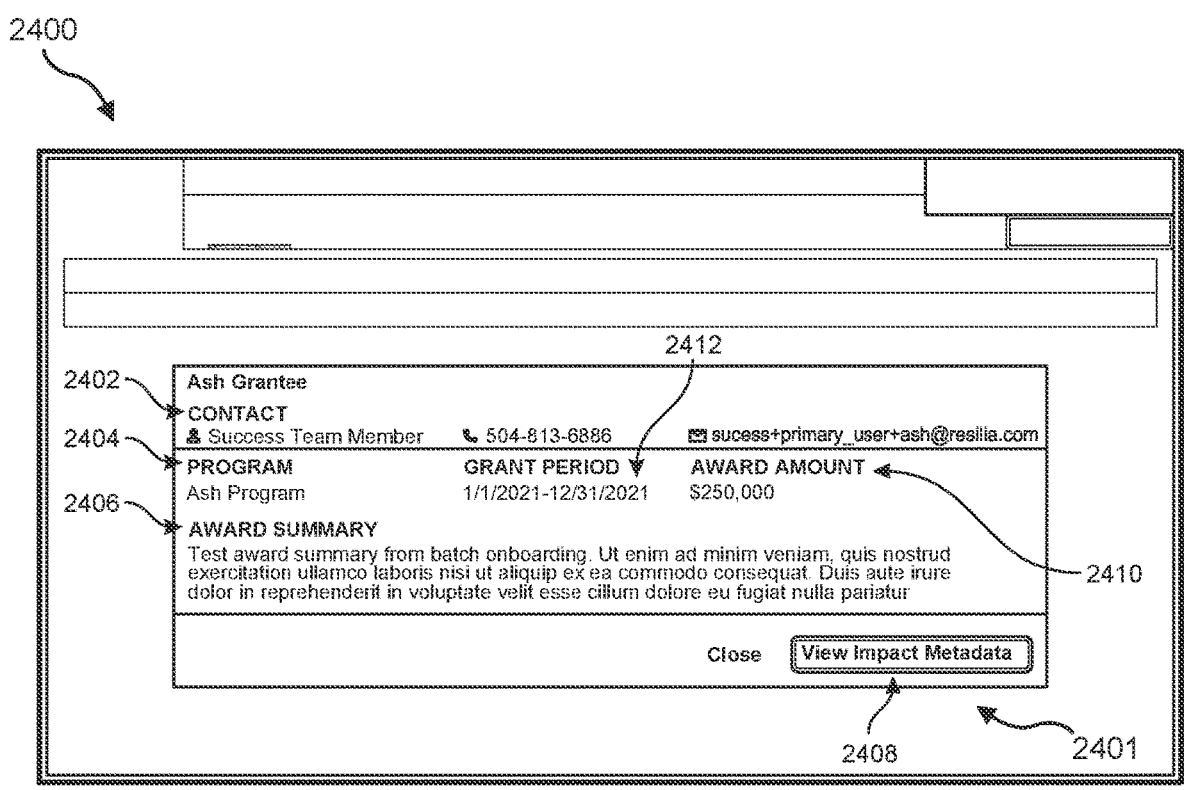
FIG. 24 is a diagram of a graphical user interface displaying corresponding intelligence about a selected program user account.

FIG. 24 shows another graphical user interface 2400 that may be displayed, at a subsequent stage of performing step 2404, and displayed in response to selection of row 2306 and/or selection of "Ash Grantee" within "ORGANIZATION" column 2310. As further shown in this figure, graphical user interface 2400 may include a display or pop-up window 2401, which may correspond to a program user account summary display, and which may further include a row 2402, a row 2404, and a headline 2406. Row 2402 may specify items of contact information with which to contact the corresponding program user account, which may represent a corresponding group, such as a nonprofit organization. The items of contact information may include a name or identifier of an individual to contact in connection with the group or the corresponding task (e.g., "Success Team Member"), a telephone number at which to contact this individual (e.g., "504-813-6886"), and an email address at which to contact this individual (e.g., success+primary_user+ash@resilia.com).

Similarly, row 2404 may specify items of information relating to the corresponding initiative, task, or program that is assigned to the specific program user account, which may correspond to a nonprofit organization, as discussed above. Row 2404 may optionally specify one or more of the following items of information: the name of the initiative, task, or program (e.g., "Ash Program"), the window of time during which the specific resource user account may be providing resources or funds to the corresponding program user account in order for the program user account to perform this task (e.g., "1/1/2021-12/31/2021"), and/or an amount of funds or resources awarded by the resource user account to the program user account for the performance of the respective task. In some examples, row 2404 may generally parallel some or all of row 2306, as further discussed above in connection with FIG. 23. Furthermore, window 2401 may also optionally include a row 2406, which may further specify "AWARD SUMMARY," and beneath this headline may be displayed a paragraph or string of text, which may describe one or more features or attributes corresponding to the respective task, as defined by the program data structure, that the specific resource user account is funding in order for the program user account to perform, as further discussed above.

Figure 25:
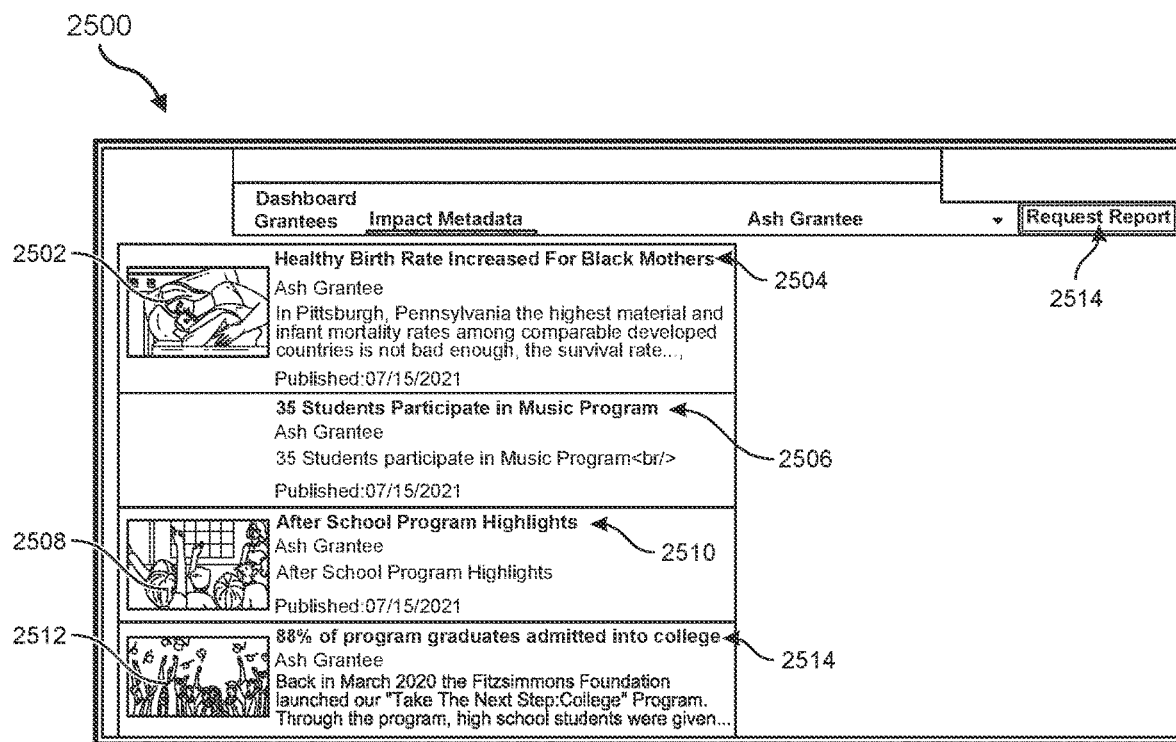
FIG. 25 is a diagram of a graphical user interface displaying corresponding intelligence about various instances of impact metadata for the selected program user account.

Window 2401 may also include a button or graphical user interface element 2408, which may enable the viewing resource user account to select and thereby view responding instances of impact metadata as discussed above in connection with FIGS. 1-19, for example. In the example of FIG. 24, the resource user account may select button 2408 and thereby navigate to a graphical user interface 2500 that is shown in FIG. 25. As further shown in this figure, the graphical user interface element that toggles between "Grantees" and "Impact Metadata" has switched to a position 2502 that indicates "Impact Metadata." Moreover, graphical user interface 2500 further displays a list of corresponding identifiers of descriptive publications for respective tasks. Each of these items in the list may correspond to an instance of "impact metadata" and/or "descriptive publications," which may include both quantitative and non-quantitative items of information describing progress towards performance of the respective task, in accordance with method 100 of FIG. 1 and/or method 200 of FIG. 2, as further discussed above. Accordingly, a respective descriptive publication enables the specific resource user account to view together both quantitative data that measures performance of the respective task in terms of a program data structure and non-quantitative data that describes the respective task defined in the database. Thus, graphical user interface 2500, in this example, may include a headline photo 2502, a headline photo 2508, a headline photo 2512, a headline 2504, a headline 2506, a headline 2510, and a headline 2514, as further shown in this figure. Lastly, graphical user interface 2500 also includes a button or graphical user interface element 2514, which may correspond to the request report button that is further discussed above.

Figure 26:
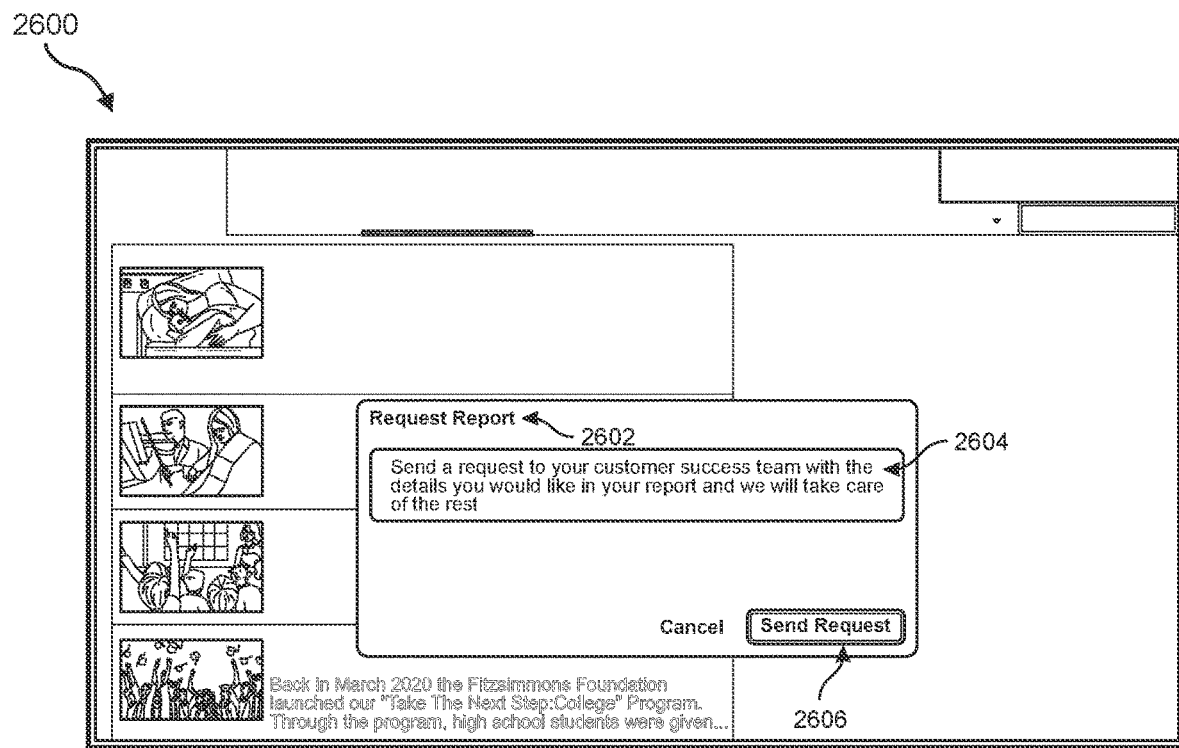
FIG. 26 is a diagram of a graphical user interface for a request report window enabling a resource user account to request a corresponding report.

FIG. 26 shows a graphical user interface 2600 for a request report interface that may be displayed in response to the user selecting graphical user interface element 2508 of FIG. 25. As further shown in this figure, selecting graphical user interface element 2508 may generate a window or pop-up message, which may further include a headline 2602 indicating "Request Report" or an analogous message, and which may include a string of text 2604, which may enable the user to enter a string of text specifying one or more items of information on which the requesting resource user account would specifically like to receive a corresponding report or analysis. String of text 2604 may begin with an instruction text, as shown in this figure, which may instruct the resource user account about how to properly use the corresponding window to request a report. The window may also include a button or graphical user interface element 2606, which may enable the user to finalize or complete instruction to request the report that is discussed above. Selecting graphical user interface element 2606 may transmit the request for the report to the corresponding program user account that is assigned to complete the respective task about which the resource user account is requesting a report and/or to an engineering or developer team as part of the vendor, company, organization, or other entity that is providing or administering the group network application (e.g., Resilia). As an example, the vendor may function as an intermediary that facilitates the connection between resource user accounts and program user accounts such that program user accounts may receive funding or resources from the resource user accounts in order to perform one or more respective tasks, as further discussed above.

Figure 27:
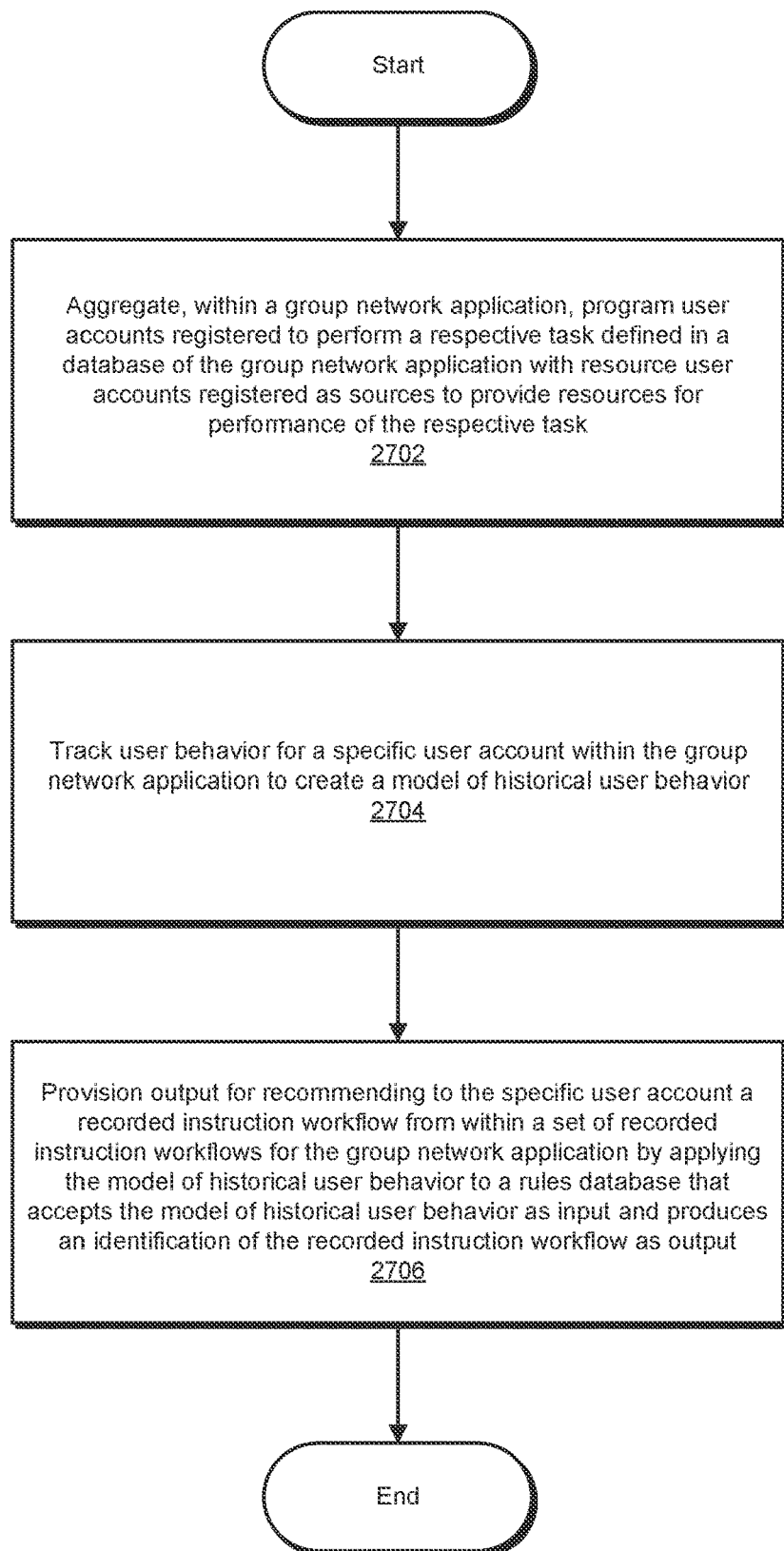
FIG. 27 is a flow diagram of an example method for recommending recorded instruction workflows.

FIG. 27 shows a flow diagram for a method 2700 that may correspond to a procedure for recommending one or more items of academic or instructional material, such as the material discussed above in connection with FIGS. 10-11, based on one or more instances of tracked user behavior, such that the recommendations are targeted or personalized based on the unique history and profile of the corresponding user, as further discussed below. At step 2702, one or more of the systems described herein may aggregate, within a group network application, program user accounts registered to perform a respective task defined in a database of the group network application with resource user accounts registered as sources to provide resources for performance of the respective task. One or more modules within a corresponding software system, such as an aggregation module, may perform step 2702. This aggregation module may perform step 2702 in a manner that essentially parallels the performance of step 110 in FIG. 1 and step 210 in FIG. 2, as further discussed above.

Returning to FIG. 27, at step 2704, one or more of the systems described herein may track user behavior for a specific user account within the group network application to create a model of historical user behavior. For example, one or more modules within a corresponding software system, such as a tracking module, may perform step 2704. The tracking module may perform step 2704 in a variety of ways. Generally speaking, the tracking module may perform step 2704 at least in part by creating a data structure that records a value for an attribute or variable to define or memorialize an aspect of at least one instance of historical user behavior by the specific user account. For example, the model of historical user behavior may require that the user has previously accessed, toggled, completed, or partially completed one or more academic or educational courses, such as the resources or courses described above in connection with FIGS. 10-11. Thus, in some examples the rules database bases a decision of whether to recommend the recorded instruction workflow at least in part on an indication of whether the specific user account has previously completed the recorded instruction workflow, as discussed further below in connection with step 2706.

One type of specific user behavior that may be beneficial to track for the purposes of performing method 2700 may include following the progress of respective tasks, as recorded or defined by corresponding program data structures. For example, a specific program user account may be assigned to, follow, or monitor progress along one or more tasks corresponding to program data structures. In the example of FIG. 6, each one of these may correspond to an instance of "impact metadata," a "metadata publication," and/or a "descriptive publication" (these terms are generally interchangeable unless indicated otherwise) that combines both quantitative and non-quantitative information in accordance with the performance of method 100 and/or method 200, as discussed above in connection with FIGS. 1-2. In other examples, a specific user account may follow progress along the performance of a specific task, goal, or initiative by simply following progress along quantitative data alone, or following progress along qualitative data alone, without these two items of information being connected in the form of a "metadata publication" as described above in connection with method 100 of FIG. 1.

In the example of FIG. 6, a specific user account (e.g., a specific program user account and/or a specific resource user account) may view a list of metadata publications, such as those metadata publications having the titles or headlines "State Animal Rescue: Animal Assistance" or "Waste Reduction Project: Tracking." Similarly, from the perspective of a resource user account, FIG. 23 shows an example of graphical user interface 2300, which may display a list of programs or initiatives (e.g., "Ash Program") that the resource user account is providing funding resources for performance of the corresponding respective task, as further discussed above. Although FIG. 23 shows a single row 2306 for a single program or initiative, the list may include multiple such programs that the resource user account is providing funding for.

In both of these examples, the corresponding specific user account may additionally elect to "follow" a set of programs or initiatives. For example, when a program user account generates a respective task or initiative (e.g., by completing the corresponding program data structure) thereby indicating that the program user account is assigned to performance of the corresponding task, or when a resource user account agrees to provide resources or funding for a corresponding task initiative, then these user accounts may automatically begin to "follow" progress of the corresponding task, as recorded within the program data structure and discussed above in connection with FIGS. 1-19, for example. In other examples, a specific user account may elect to "follow" a particular initiative, as recorded by a corresponding program data structure, by selecting or toggling a graphical user interface element, such as a "follow" button. This procedure may present another mechanism by which a specific user account may add to the list of programs or initiatives that the specific user account sees in the graphical user interface of FIG. 6 or FIG. 23, for example. In view of the above, one valuable item of information to record within the model of historical user behavior will be an indication or list of the programs or initiatives that a specific user account is following.

Returning to FIG. 27, at step 2706, one or more of the systems described herein may provision output for recommending to the specific user account a recorded instruction workflow from within a set of recorded instruction workflows for the group network application by applying the model of historical user behavior to a rules database that accepts the model of historical user behavior as input and produces an identification of the recorded instruction workflow as output. One or more provisioning modules within a software system may perform step 2706. For example, the same provisioning module that performs steps 120-130 of method 100 of FIG. 1 or steps 220-230 of method 200 of FIG. 2 may perform step 2706.

The respective provisioning module may perform step 2706 in a variety of ways. Generally speaking, the provisioning module may perform step 2706 at least in part by applying the model of historical user behavior as input to the rules database, and receiving the recommendation of a specific recorded instruction workflow as output, as further discussed above. As used herein, the term "recorded instruction workflow" generally refers to a series of two or more graphical user interface interactions, and/or website navigations, that collectively may provide academic or instructional information to thereby educate a corresponding specific user account. In particular, the recorded instruction workflow may educate the specific user account about one or more items of information relating to a nonprofit organization performing a respective task using funds or resources provided by a respective resource user account (e.g., through an intermediary such as Resilia). Illustrative examples of such resources, articles, or recorded instruction workflows are shown in FIGS. 10-11 (e.g., navigating to and reading the article "How to Use Impact Metadata" may correspond to a recorded instruction workflow, and may educate a specific program user account about how to create a metadata publication in accordance with method 100 using a group network application such as Resilia). Thus, the recorded instruction workflow may correspond to a specific instance of a resource, a specific instance of coaching, or a specific instance of training, etc. FIG. 10 shows how the group network application provides output to display a list of graphical user interface elements corresponding to separate types of recorded instruction workflows. As further shown in FIG. 10, the specific instance of the resource may belong to a displayed set of resources that includes two, three, four, or all of the following: a resource regarding securing additional supplies for a group corresponding to the program user account (button 1012), a resource regarding board management (button 1016), a resource regarding design of the group (button 1018), a resource regarding information on maintaining obedience to a non-distribution constraint or maintaining nonprofit status (button 1020), or a resource regarding procedures for improving metadata publications or descriptive publications about tasks assigned to a group that the program user account represents (button 1022).

In further examples, the group network application provides output to further display, in response to a specific user selecting a specific one of the list of graphical user interface elements (e.g., one of the list of buttons 1012-1022 shown in FIG. 10), a list identifying different recorded instruction workflows corresponding to the specific one selected by the specific user. Thus, when the specific user account selects button 1022 in FIG. 10, the graphical user interface 1100 of FIG. 11 is shown in response, thereby displaying a list of different recorded instruction workflows, each of which may inform the specific user account about one or more instances of impact metadata, as further discussed above.

In some examples, the group network application enables the specific user account to follow the progress of tasks for corresponding program data structures, the model of historical user behavior tracks which program data structures the specific user account is following, and the rules database accepts the identification of which program data structures the specific user account is following as input and produces the identification of the recommended recorded instruction workflow as output. Returning to FIG. 6 and FIG. 23, a specific user account may be following one or more of the lists of programs or initiatives that are shown within these figures. Accordingly, the fact that the user is following these specific programs may be recorded within the model of historical user behavior. The rules database may accept this model of historical user behavior, with the indication of which programs or initiatives the specific user account is actually following, as input.

The rules database may then apply one or more rules, which are recorded within the rules database, to thereby generate, as output, a recommendation of a specific recorded instruction workflow. In this matter, the rules database may function as an algorithm, heuristic, or inference engine, etc. In some examples, the rules database may operate through a machine learning algorithm. Additionally, or alternatively, the rules database may be generated or administered by a human administrator (e.g., an administrator for the group network application such as Resilia). In even further examples, the rules database may additionally, or alternatively, operate through one or more of the following algorithm approaches: collaborative filtering, content-based filtering, session-based recommender systems, reinforcement learning for recommender systems, multi-criteria recommender systems, risk-aware recommender systems, mobile recommender systems, and/or hybrid recommender systems.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) group. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) group. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   aggregating, within a group network application, program user accounts registered to perform a respective task defined in a database of the group network application with resource user accounts registered as sources to provide resources for performance of the respective task;
   provisioning a program application subcomponent within the group network application that enables a specific program user account to complete a program data structure that defines the respective task, the program application subcomponent configured such that an interface is displayed that enables the specific program user account to enter separately items of information including a set of at least one dimension to define the respective task and at least two of a goal, a metric, a measure, and a target;
   provisioning output for a graphical user interface that displays an updated graph that plots each one of the set of at least one dimension across an axis in response to the specific program user account entering the items of information; and
   linking, within the database of the group network application, and in response to user instruction, the program data structure completed through the program application subcomponent with rich network data entered through a metadata application subcomponent such that another user account is enabled to view together both quantitative data that measures performance of the respective task in terms of the program data structure and qualitative data that describes the respective task defined in the database.

2. The method of claim 1, wherein the interface enables the specific program user account to enter the set of at least one dimension at least in part by selecting a graphical user interface button indicating an addition of a new dimension.

3. The method of claim 1, wherein the interface displays, for each dimension in the at least one dimension, a starting value.

4. The method of claim 1, wherein the interface displays, for a specific dimension, a cancellation graphical user interface button that, when selected, deletes the specific dimension.

5. The method of claim 1, wherein the graphical user interface displays simultaneously both the updated graph that plots each one of the set of at least one dimension and the interface that enables the specific program user account to enter separately the set of at least one dimension to define the respective task and the at least two of the goal, the metric, the measure, and the target.

6. The method of claim 1, wherein the updated graph plots an average of each one of the set of at least one dimension in addition to plotting each one of the set of at least one dimension across the axis.

7. The method of claim 1, wherein the updated graph indicates a count along a first axis of the updated graph and indicates time along a second axis of the updated graph.

8. The method of claim 1, wherein the updated graph plots each one of the set of at least one dimension in a separate color.

9. The method of claim 1, wherein the updated graph displays a bar across one axis of the updated graph such that the bar indicates a goal to be achieved in terms of the respective task.

10. The method of claim 1, wherein the graphical user interface further displays a numerical count that indicates progress toward a goal to be achieved in terms of the respective task.

11. The method of claim 10, wherein the graphical user interface further displays the numerical count as a numerator within a numerical ratio.

12. The method of claim 11, wherein a denominator within the numerical ratio corresponds to the goal to be achieved in terms of their respective task.

13. The method of claim 1, wherein the graphical user interface is provided through a web interface.

14. The method of claim 1, wherein a respective graphical user interface element is configured for the set of at least one dimension or at least one of the metric, the measure, and the target such that the graphical user interface element, when interacted with by a graphical user interface cursor, triggers a tooltip pop-up notification that provides a respective explanation of the dimension, the metric, the measure, or the target accordingly.

15. The method of claim 1, wherein the interface requests for the specific program user account to enter separately the set of at least one dimension to define the respective task and the at least two of the goal, the metric, the measure, and the target.

16. The method of claim 1, wherein the graphical user interface enables the specific program user account to enter a plurality of goals that are assigned, within the group network application, to the respective task.

17. The method of claim 1, wherein the interface effectively guides the specific program user account through a process of completing the program data structure that defines the respective task.

18. A system comprising:
an aggregation module, stored in memory, that aggregates, within a group network application, program user accounts registered to perform a respective task defined in a database of the group network application with resource user accounts registered as sources to provide resources for performance of the respective task; and
a provisioning module, stored in memory, that:
provisions a program application subcomponent within the group network application that enables a specific program user account to complete a program data structure that defines the respective task, the program application subcomponent configured such that an interface is displayed that enables the specific program user account to enter separately items of information including a set of at least one dimension to define the respective task and at least two of a goal, a metric, a measure, and a target; and
provisions output for a graphical user interface that displays an updated graph that plots each one of the set of at least one dimension across an axis in response to the specific program user account entering the items of information; and
at least one physical processor configured to execute the aggregation module and the provisioning module;
wherein the system is further configured to link, within the database of the group network application, and in response to user instruction, the program data structure completed through the program application subcomponent with rich network data entered through a metadata application subcomponent such that another user account is enabled to view together both quantitative data that measures performance of the respective task in terms of the program data structure and qualitative data that describes the respective task defined in the database.

19. A non-transitory computer-readable medium storing computer-executable instructions that, when executed by at least one physical processor of a computing device, cause the computing device to perform a method comprising:
aggregating, within a group network application, program user accounts registered to perform a respective task defined in a database of the group network application with resource user accounts registered as sources to provide resources for performance of the respective task; and
provisioning a program application subcomponent within the group network application that enables a specific program user account to complete a program data structure that defines the respective task, the program application subcomponent configured such that an interface is displayed that enables the specific program user account to enter separately items of information including a set of at least one dimension to define the respective task and at least two of a goal, a metric, a measure, and a target;
provisioning output for a graphical user interface that displays an updated graph that plots each one of the set of at least one dimension across an axis in response to the specific program user account entering the items of information; and
link, within the database of the group network application, and in response to user instruction, the program data structure completed through the program application subcomponent with rich network data entered through a metadata application subcomponent such that another user account is enabled to view together both quantitative data that measures performance of the respective task in terms of the program data structure and qualitative data that describes the respective task defined in the database.

* * * * *